(12) United States Patent
Takeuchi et al.

(10) Patent No.: US 8,815,075 B2
(45) Date of Patent: Aug. 26, 2014

(54) WATER ELECTROLYSIS SYSTEM AND METHOD OF OPERATING SAME

(75) Inventors: Jun Takeuchi, Saitama (JP); Koji Nakazawa, Utsunomiya (JP); Hisashi Nagaoka, Utsunomiya (JP); Tetsuya Yoshida, Saitama (JP); Masanori Okabe, Tokyo (JP); Daisuke Kurashina, Saitama (JP); Aoi Miyake, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 115 days.

(21) Appl. No.: 13/438,273

(22) Filed: Apr. 3, 2012

(65) Prior Publication Data

US 2012/0255868 A1     Oct. 11, 2012

(30) Foreign Application Priority Data

Apr. 5, 2011   (JP) ................. 2011-083946
Jul. 21, 2011   (JP) ................. 2011-159762

(51) Int. Cl.
    *C25B 1/04*      (2006.01)

(52) U.S. Cl.
    USPC .................. 205/628; 204/228.2; 204/263

(58) Field of Classification Search
    USPC ............... 204/228.2, 263; 205/628–632
    See application file for complete search history.

(56) References Cited

U.S. PATENT DOCUMENTS

| | | | |
|---|---|---|---|
| 5,690,797 A | 11/1997 | Harada et al. | |
| 2003/0201187 A1 | 10/2003 | Speranza et al. | |
| 2010/0206740 A1* | 8/2010 | Takeuchi et al. ............... 205/338 |
| 2010/0230295 A1 | 9/2010 | Taruya et al. | |
| 2010/0264038 A1 | 10/2010 | Duret | |

FOREIGN PATENT DOCUMENTS

| | | |
|---|---|---|
| DE | 103 17 767 A1 | 11/2003 |
| DE | 130 17 767 A1 | 11/2003 |
| JP | 08-193287 A | 7/1996 |
| JP | 2006-347779 A | 12/2006 |
| JP | 2009-19133 A | 8/2009 |
| JP | 2009-191333 A | 8/2009 |
| JP | 2010-189707 A | 2/2010 |
| JP | 2010-189707 A | 9/2010 |
| JP | 2010-236089 A | 10/2010 |

OTHER PUBLICATIONS

Japanese Decision to Grant a Patent dated Jun. 25, 2013.
German Office Action application No. 102012205732.3 dated Jan. 11, 2013.

* cited by examiner

*Primary Examiner* — Nicholas A Smith
(74) *Attorney, Agent, or Firm* — Squire Patton Boggs (US) LLP

(57) ABSTRACT

A water electrolysis system includes a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a high-pressure hydrogen outlet pipe for delivering the high-pressure hydrogen separated from water from the gas-liquid separator, a water drainage line for discharging the water from the gas-liquid separator, and a gas depressurizing line connected to the gas-liquid separator, for degassing the gas-liquid separator before the water is discharged from the water drainage line into the water drainage line.

5 Claims, 24 Drawing Sheets

WATER ELECTROLYSIS SYSTEM AND METHOD OF OPERATING SAME

CROSS-REFERENCE TO RELATED APPLICATION

This application is based upon and claims the benefit of priority from Japanese Patent Applications No. 2011-083946 filed on Apr. 5, 2011 and No. 2011-159762 filed on Jul. 21, 2011, of which the contents are incorporated herein by reference.

BACKGROUND OF THE INVENTION

1. Field of the Invention

The present invention relates to a water electrolysis system including a water electrolysis apparatus for electrically decomposing water to generate oxygen and high-pressure hydrogen having a pressure higher than the oxygen, and a gas-liquid separator connected to a hydrogen pipe which discharges the high-pressure hydrogen from the water electrolysis apparatus, for separating water contained in the high-pressure hydrogen, and a method of operating such a water electrolysis apparatus.

2. Description of the Related Art

Generally, hydrogen is used as a fuel gas in a reaction to generate electric energy in fuel cells. The hydrogen is generated by water electrolysis apparatus, for example. A water electrolysis apparatus incorporates a solid polymer electrolyte membrane (ion exchange membrane) for electrically decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit cell.

A plurality of such unit cells are stacked into a cell unit, and a voltage is applied across the cell unit while water is supplied to the current collectors on the anode side. On the anodes of the membrane electrode assembly, the water is decomposed to produce hydrogen ions (protons). The hydrogen ions permeate through the solid polymer electrolyte membranes to the cathodes, where the hydrogen ions combine with electrons to generate hydrogen. On the anodes, oxygen generated together with hydrogen is discharged with excess water from the cell units.

The water electrolysis apparatus generates hydrogen containing water. The water needs to be removed from the hydrogen to obtain hydrogen in a dry state, hereinafter referred to as "dry hydrogen", which contains 5 ppm or less of water.

A differential-pressure-type high-pressure hydrogen manufacturing apparatus generates hydrogen under a high pressure, e.g., 1 MPa or higher, which is higher than oxygen, at cathodes. Such a differential-pressure-type high-pressure hydrogen manufacturing apparatus needs a large-size gas-liquid separator for removing water from high-pressure hydrogen.

There is known a gas-liquid separator disclosed in Japanese Laid-Open Patent Publication No. 2006-347779, for example. As shown in FIG. 24 of the accompanying drawings, the disclosed gas-liquid separator includes a pressure-resistant vessel 2 to which a hydrogen conduit 1 is connected, a water level sensor 3 for detecting a water level in the pressure-resistant vessel 2, a hydrogen removal conduit 4a of a hydrogen removal means 4 connected to a top wall of the pressure-resistant vessel 2, and a water drainage conduit (water drainage line) 5a of a water drainage means 5 connected to a bottom wall of the pressure-resistant vessel 2.

The hydrogen removal conduit 4a has a first back-pressure valve 6 and a solenoid-operated valve 7 disposed downstream of the first back-pressure valve 6. The water drainage conduit 5a has a second back-pressure valve 8.

The first back-pressure valve 6 is opened when the pressure of a fluid flowing thereinto reaches 35 MPa, for example. The second back-pressure valve 8 is opened when the pressure of a fluid flowing thereinto reaches a pressure level higher than the first back-pressure valve 6, e.g., 36 MPa. The solenoid-operated valve 7 is actuated in response to a detected signal from the water level sensor 3. Specifically, when the water level detected by the water level sensor 3 reaches a certain low level, the solenoid-operated valve 7 is opened, and when the water level detected by the water level sensor 3 reaches a certain high level, the solenoid-operated valve 7 is closed.

When the solenoid-operated valve 7 is closed, a high-pressure hydrogen gas removed from the pressure-resistant vessel 2 through the hydrogen removal conduit 4a is forcibly blocked thereby, causing the pressure in the pressure-resistant vessel 2 to increase beyond 35 MPa, i.e., the pressure setting of the first back-pressure valve 6. As a result, each time the pressure in the pressure-resistant vessel 2 reaches 36 MPa, i.e., the pressure setting of the second back-pressure valve 8, the second back-pressure valve 8 is opened. Consequently, water in liquid phase is intermittently discharged from the pressure-resistant vessel 2 through the water drainage conduit 5a and the second back-pressure valve 8.

SUMMARY OF THE INVENTION

When the second back-pressure valve 8 is opened to discharge the water in liquid phase from the pressure-resistant vessel 2 through the water drainage conduit 5a and the second back-pressure valve 8, the pressure of the discharged water abruptly drops. Therefore, a large load tends to be applied to the second back-pressure valve 8. As the differential pressure applied across a high-pressure device such as the second back-pressure valve 8 or the like increases, an increased amount of bubbles of hydrogen dissolved in the water is generated, greatly reducing the endurance time of the high-pressure device. A high differential pressure applied across the second back-pressure valve 8 is liable to damage the seals of the second back-pressure valve 8, resulting in a reduction in the durability of the second back-pressure valve 8.

The water that is discharged from the pressure-resistant vessel 2 under the pressure of high-pressure hydrogen therein contains a large amount of hydrogen dissolved therein. Therefore, when the water is discharged under high pressure from the pressure-resistant vessel 2, a large amount of hydrogen is also discharged from the pressure-resistant vessel 2, posing economic problems.

It is an object of the present invention to provide a water electrolysis system which is capable of effectively reducing hydrogen dissolved in discharged water, preventing high-pressure water from being discharged into a water drainage line, and increasing the durability of a device that is connected to the water drainage line, and to provide a method of operating such a water electrolysis system.

According to the present invention, there is provided a water electrolysis system comprising a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a high-pressure hydrogen outlet pipe for delivering the high-pressure hydrogen separated from water from the gas-liquid separator, and a water drainage line for discharging the water from the gas-liquid separator.

The water electrolysis system also includes a gas depressurizing line connected to the gas-liquid separator, for degassing the gas-liquid separator before the water is discharged from the gas-liquid separator into the water drainage line.

According to the present invention, there is also provided a method of operating a water electrolysis system including a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a high-pressure hydrogen outlet pipe for delivering the high-pressure hydrogen separated from water from the gas-liquid separator, a water drainage line for discharging the water from the gas-liquid separator, and a gas depressurizing line connected to the gas-liquid separator, for degassing the gas-liquid separator before the water is discharged from the gas-liquid separator into the water drainage line.

The method comprises the steps of discharging the high-pressure hydrogen from the gas-liquid separator into the gas depressurizing line if the amount of water in the gas-liquid separator is judged as being equal to or greater than a prescribed amount, and discharging the water from the gas-liquid separator into the water drainage line if the pressure in the gas-liquid separator is judged as being equal to or lower than a prescribed pressure.

According to the present invention, there is further provided a method of operating a water electrolysis system including a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a back-pressure valve included in the hydrogen pipe and positioned between the water electrolysis apparatus and the gas-liquid separator, a depressurizing line branched from the hydrogen pipe upstream of the back-pressure valve and including a first on-off valve, a gas depressurizing line connected to a gas section of the gas-liquid separator for degassing the gas section and including a second on-off valve, and a water drainage line connected to a liquid section of the gas-liquid separator for discharging water from the liquid section and including a third on-off valve.

The method comprises the steps of opening the first on-off valve and the second on-off valve if the amount of water in the gas-liquid separator is judged as being equal to or greater than a prescribed upper limit amount, closing the second on-off valve and opening the third on-off valve if the pressure in the gas-liquid separator is judged as being equal to or lower than a prescribed lower limit pressure, and closing the first on-off valve and the third on-off valve if the amount of water in the gas-liquid separator is judged as being equal to or smaller than a prescribed lower limit amount.

According to the present invention, there is further provided a method of operating a water electrolysis system including a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a back-pressure valve included in the hydrogen pipe and positioned between the water electrolysis apparatus and the gas-liquid separator, a gas depressurizing line connected to a gas section of the gas-liquid separator for degassing the gas section and including a first on-off valve, a water drainage line connected to a liquid section of the gas-liquid separator for discharging water from the liquid section and including a second on-off valve, a high-pressure hydrogen storage device disposed downstream of the gas-liquid separator, and a pressure equalizing line interconnecting the high-pressure hydrogen storage device and the gas-liquid separator and including a third on-off valve.

The method comprises the steps of opening the first on-off valve if the amount of water in the gas-liquid separator is judged as being equal to or greater than a prescribed upper limit amount, closing the first on-off valve and opening the second on-off valve if the pressure in the gas-liquid separator is judged as being equal to or lower than a prescribed lower limit pressure, closing the second on-off valve if the amount of water in the gas-liquid separator is judged as being equal to or smaller than a prescribed lower limit amount, and after closing the second on-off valve, opening the third on-off valve thereby to equalize the pressure in the gas-liquid separator to the pressure in the high-pressure hydrogen storage device.

Alternatively, the last-mentioned method comprises the steps of opening the first on-off valve if the amount of water in the gas-liquid separator is judged as being equal to or greater than a prescribed upper limit amount, closing the first on-off valve and opening the second on-off valve and the third on-off valve if the pressure in the gas-liquid separator is judged as being equal to or lower than a prescribed lower limit pressure, and closing the second on-off valve and equalizing the pressure in the gas-liquid separator and the pressure in the high-pressure hydrogen storage device to each other if the amount of water in the gas-liquid separator is judged as being equal to or smaller than a prescribed lower limit amount.

Before the water is discharged from the gas-liquid separator into the water drainage line, the gas-liquid separator is degassed or depressurized through the gas depressurizing line. Therefore, the amount of hydrogen dissolved in the water discharged from the gas-liquid separator into the water drainage line is effectively reduced, and high-pressure water is prevented from being discharged into the water drainage line.

Consequently, the devices in the water drainage line have their durability easily increased with a relatively simple arrangement and process. The water electrolysis system is thus capable of stably performing an economical and efficient water electrolyzing process.

Furthermore, when the gas-liquid separator is degassed or depressurized through the gas depressurizing line, the water electrolysis apparatus is depressurized through an apparatus depressurizing line which is branched from the hydrogen pipe upstream of the back-pressure valve. In other words, the gas-liquid separator is depressurized through the gas depressurizing line downstream of the back-pressure valve, and the water electrolysis apparatus is depressurized through the apparatus depressurizing line upstream of the back-pressure valve.

Consequently, the pressure difference between the region upstream of the back-pressure valve and the region downstream of the back-pressure valve is reliably prevented from increasing beyond a prescribed pressure level. The seals of the back-pressure valve are thus prevented from being unduly damaged. Accordingly, the gas-liquid separator can be depressurized and the water can be discharged therefrom through a simple process. In addition, the durability of the back-pressure valve disposed between the water electrolysis apparatus and the gas-liquid separator is effectively increased.

Moreover, after the gas-liquid separator is degassed or depressurized through the gas depressurizing line and then the water is discharged from the gas-liquid separator through the water drainage line, the high-pressure hydrogen storage device supplies high-pressure hydrogen to the gas-liquid separator. Since the pressure in the gas-liquid separator and the pressure in the high-pressure hydrogen storage device are quickly equalized, the pressure difference between the region upstream of the back-pressure valve and the region downstream of the back-pressure valve is eliminated in a short period of time.

Accordingly, the gas-liquid separator can be depressurized and the water can be discharged therefrom through a simple process, and the back-pressure valve disposed between the water electrolysis apparatus and the gas-liquid separator effectively increases its durability.

Further, after the gas-liquid separator is degassed or depressurized through the gas depressurizing line, the water is discharged from the gas-liquid separator through the water drainage line and the high-pressure hydrogen storage device supplies high-pressure hydrogen to the gas-liquid separator. Since the pressure in the gas-liquid separator and the pressure in the high-pressure hydrogen storage device are quickly equalized, the pressure difference between the region upstream of the back-pressure valve and the region downstream of the back-pressure valve is eliminated in a short period of time.

Accordingly, the gas-liquid separator can be depressurized and the water can be discharged therefrom through a simple process, and the back-pressure valve disposed between the water electrolysis apparatus and the gas-liquid separator effectively increases its durability.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
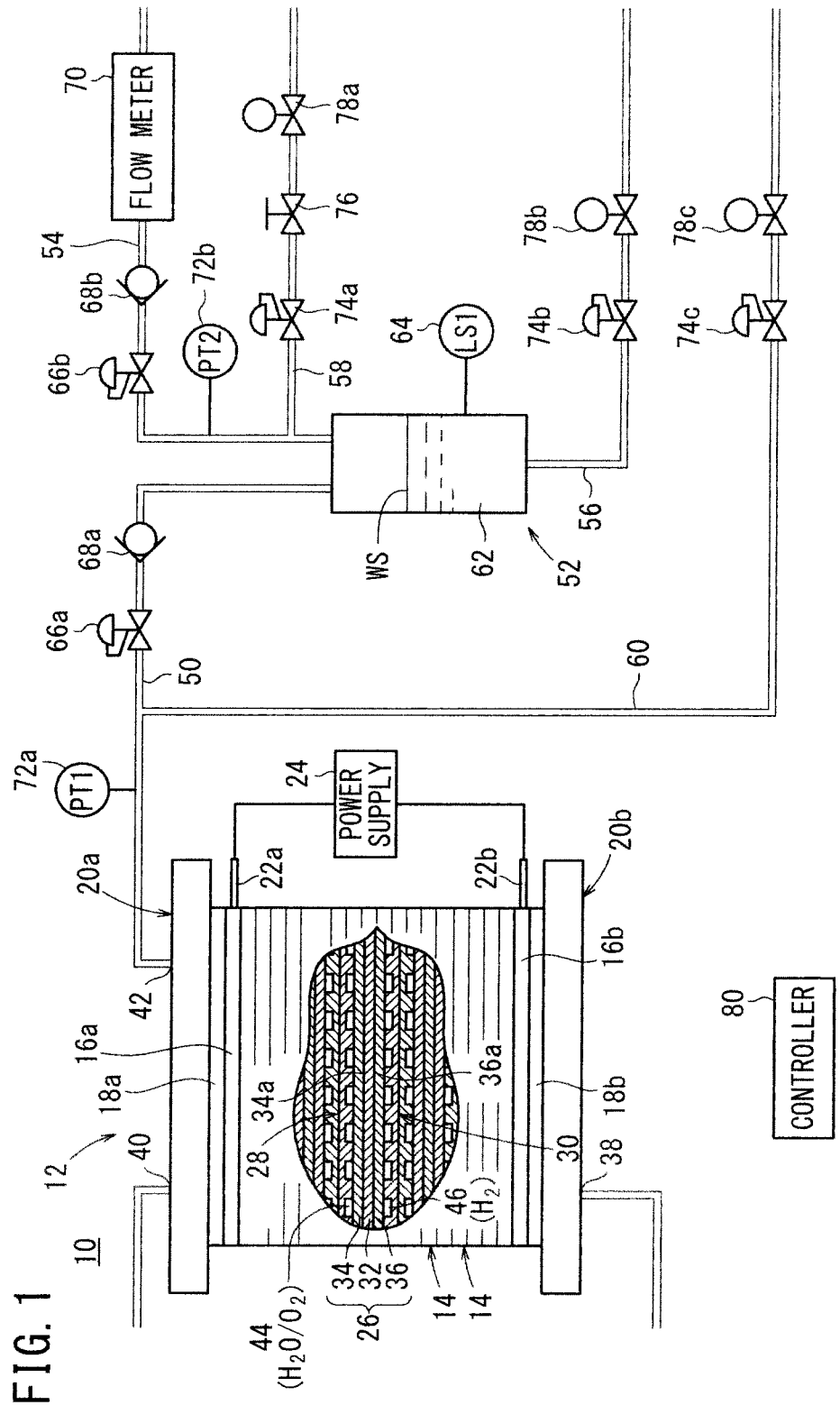
FIG. 1 is a schematic diagram of a water electrolysis system according to a first embodiment of the present invention.

As shown in FIG. 1, a water electrolysis system 10 according to a first embodiment of the present invention includes a differential-pressure-type water electrolysis apparatus (high-pressure hydrogen manufacturing apparatus) 12 which electrically decomposes water (pure water) to generate oxygen and high-pressure hydrogen having a pressure higher than an ordinary oxygen pressure, e.g., hydrogen having a pressure in the range from 1 MPa to 70 MPa.

The differential-pressure-type water electrolysis apparatus 12 has a cell unit comprising a stack of unit cells 14. The differential-pressure-type water electrolysis apparatus 12 also includes a terminal plate 16a, an insulating plate 18a, and an end plate 20a which are mounted on one end of the cell unit in a successive array outwardly in the order named, and a terminal plate 16b, an insulating plate 18b, and an end plate 20b which are mounted on another end of the cell unit in a successive array outwardly in the order named. The unit cells 14, the terminal plates 16a, 16b, and the insulating plates 18a, 18b between the end plates 20a, 20b are integrally firmly fastened together.

Terminals 22a, 22b project outwardly from sides of the terminal plates 16a, 16b, and are electrically connected to an electrolyzing power supply 24.

Each of the unit cells 14 comprises a disk-shaped membrane electrode assembly 26, and an anode separator 28 and a cathode separator 30 which sandwich the membrane electrode assembly 26 therebetween. Each of the anode separator 28 and the cathode separator 30 is of a disk shape.

The membrane electrode assembly 26 has a solid polymer electrolyte membrane 32 comprising a thin membrane of perfluorosulfonic acid which is impregnated with water, and an anode current collector 34 and a cathode current collector 36 which are disposed respectively on the opposite surfaces of the solid polymer electrolyte membrane 32.

The opposite surfaces of the solid polymer electrolyte membrane 32 are coated with an anode catalyst layer 34a and a cathode catalyst layer 36a, respectively. The anode catalyst layer 34a is made of an Ru (ruthenium)-based catalyst, for example, and the cathode catalyst layer 36a of a platinum catalyst, for example.

The unit cells 14 have water supply passages 38 for supplying water (pure water), discharge passages 40 for discharging reaction-generated oxygen and unreacted water (mixed fluid), and hydrogen passages 42 for delivering reaction-generated high-pressure hydrogen, all defined in their outer peripheral edge regions thereof and held in fluid communication along the stack of unit cells 14.

The anode separators 28 have a first flow field 44 defined in their surfaces facing the membrane electrode assemblies 26 and held in fluid communication with the water supply passages 38 and the discharge passages 40. The first flow field 44 is present in a region corresponding to the surface area of the anode current collectors 34, and is in the form of a plurality of grooves or embossed patterns. The reaction-generated oxygen and unreacted water flows through the first flow field 44.

The cathode separators 30 have a second flow field 46 defined in their surfaces facing the membrane electrode assemblies 26 and held in fluid communication with the hydrogen passages 42. The second flow field 46 is present in a region corresponding to the surface area of the cathode current collectors 36, and is in the form of a plurality of grooves or embossed patterns. The reaction-generated high-pressure hydrogen flows through the second flow field 46.

The hydrogen passages 42 are connected to an end of a hydrogen pipe 50 for discharging the high-pressure hydrogen from the water electrolysis apparatus 12. The other end of the hydrogen pipe 50 is connected to a gas-liquid separator 52.

The gas-liquid separator 52 removes water contained in the high-pressure hydrogen discharged from the water electrolysis apparatus 12. To the gas-liquid separator 52, there are connected a high-pressure hydrogen outlet pipe 54 for delivering the high-pressure hydrogen separated from water to a hydrogen tank or the like, not shown, and a water drainage line 56 for discharging the water separated from the high-pressure hydrogen.

The gas-liquid separator 52 is also connected to a gas depressurizing line 58 which depressurizes the gas in the gas-liquid separator 52 (or degasses the gas-liquid separator 52) before the water is discharged from the gas-liquid separator 52 into the water drainage line 56. The gas depressurizing line 58 is branched from the high-pressure hydrogen outlet pipe 54 at a position near the gas-liquid separator 52.

The hydrogen pipe 50 branches into an apparatus (water electrolysis apparatus) depressurizing line 60 upstream of the gas-liquid separator 52. The apparatus depressurizing line 60 depressurizes the water electrolysis apparatus 12.

The gas-liquid separator 52 has a tank 62 for storing water therein. The tank 62 is combined with a water level sensor 64 for detecting a water level WS in the tank 62 to ascertain whether or not the water level WS is equal to or higher than an upper limit height (prescribed upper limit amount) H and whether or not the water level WS is equal to or lower than a lower limit height (prescribed lower limit amount) L.

The hydrogen pipe 50 includes a first back-pressure valve 66a and a first check valve 68a that are positioned between the branched end of the apparatus depressurizing line 60 and the gas-liquid separator 52.

The high-pressure hydrogen outlet pipe 54 includes a second back-pressure valve 66b and a second check valve 68b that are positioned downstream of the branched end of the gas depressurizing line 58. A flow meter 70 is positioned downstream of the second check valve 68b.

A first pressure gage 72a is connected to the hydrogen pipe 50 near the end thereof that is connected to the water electrolysis apparatus 12. A second pressure gage 72b is connected to the high-pressure hydrogen outlet pipe 54 at a position between the second back-pressure valve 66b and the branched end of the gas depressurizing line 58. The gas depressurizing line 58 includes a first pressure reducing valve 74a, a restriction 76, and a first on-off valve 78a. The restriction 76 is in the form of an orifice, a needle valve, or the like.

The water drainage line 56 includes a second pressure reducing valve 74b and a second on-off valve 78b. The apparatus depressurizing line 60 includes a third pressure reducing valve 74c and a third on-off valve 78c. The various devices, including the valves, of the water electrolysis system 10 and the water electrolysis system 10 itself are controlled by a controller 80.

Operation of the water electrolysis system 10 will be described below.

Figure 2:
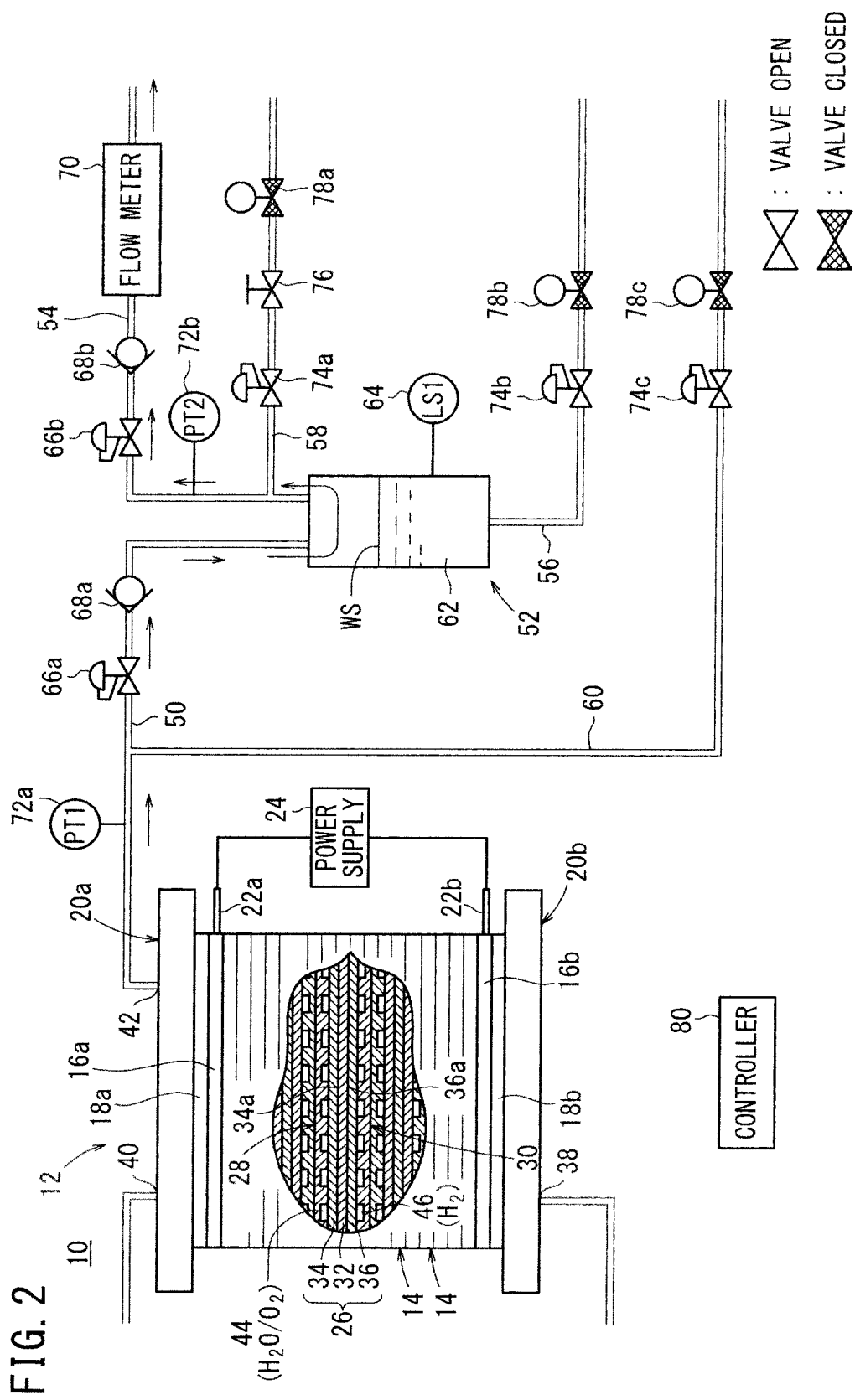
FIG. 2 is a schematic diagram of the water electrolysis system according to the first embodiment which is operating in a normal mode.

While the water electrolysis system 10 is operating in a normal mode, the first on-off valve 78a, the second on-off valve 78b, and the third on-off valve 78c are closed, as shown in FIG. 2. The water electrolysis apparatus 12 is supplied with pure water through a water circulator, not shown, connected to the water supply passages 38. The electrolyzing power supply 24 applies a voltage, i.e., supplies a current, between the terminals 22a, 22b projecting from the terminal plates 16a, 16b.

In each of the unit cells 14, water is supplied from the water supply passage 38 into the first flow field in the anode separator 28, and flows along the anode current collector 34. The water is electrically decomposed by the anode catalyst layer 34a, generating hydrogen ions, electrons, and oxygen. The hydrogen ions that are generated by the anodic reaction permeate through the solid polymer electrolyte membrane 32 to the cathode catalyst layer 36a, where they combine with electrons to generate hydrogen.

The hydrogen flows in and along the second flow field 46 that is defined between the cathode separator 30 and the cathode current collector 36. The hydrogen is kept under a pressure higher than the water in the water supply passages 38, and flows through the hydrogen passages 42 out of the water electrolysis apparatus 12.

Figure 3:
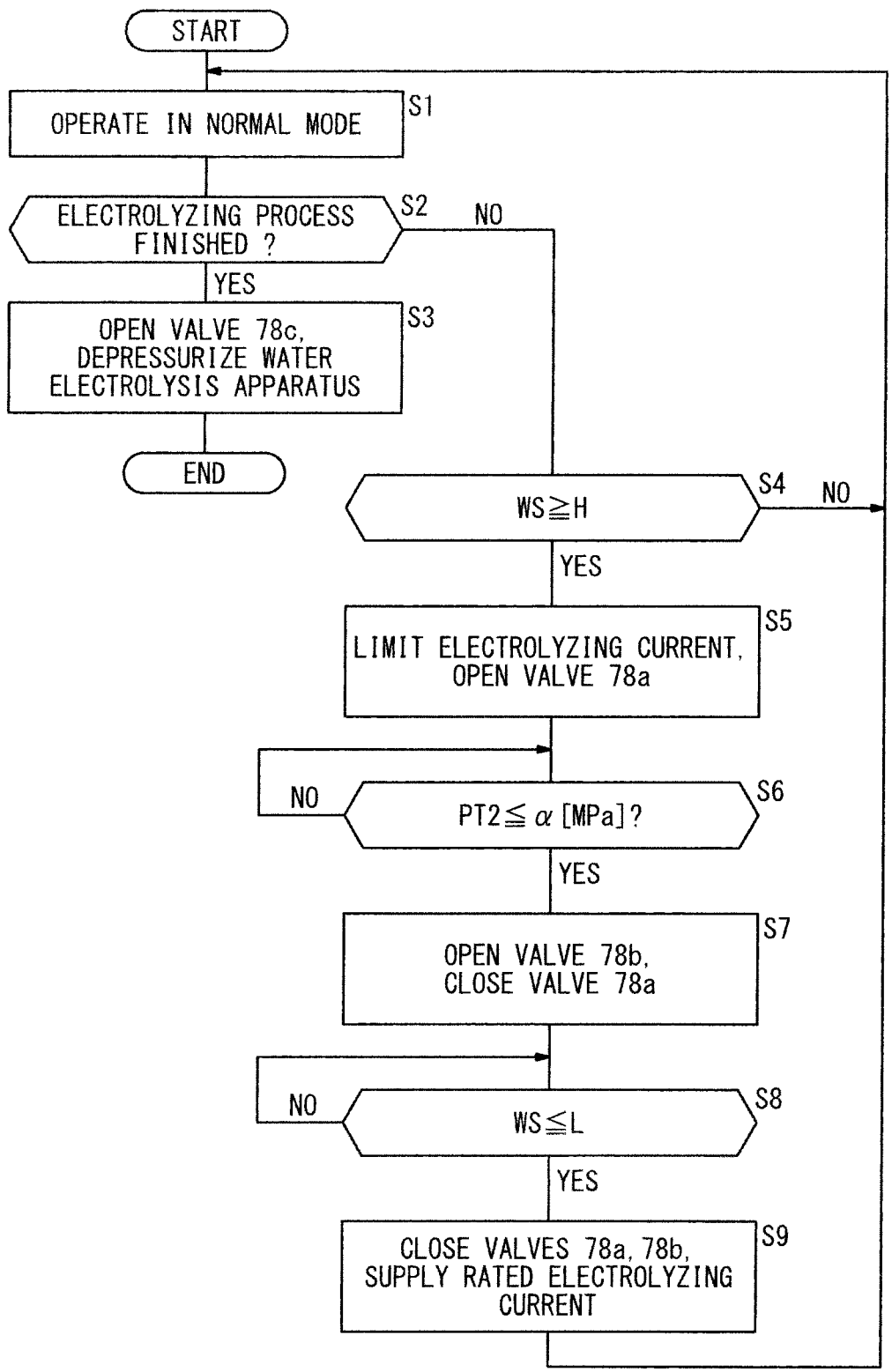
FIG. 3 is a flowchart of a method of operating the water electrolysis system according to the first embodiment.

A method of operating the water electrolysis system 10 according to the first embodiment will be described below with reference to a flowchart shown in FIG. 3.

As described above, the water electrolysis system 10 is operating in the normal mode (hydrogen manufacturing step) in step S1. The high-pressure hydrogen which is manufactured flows through the hydrogen pipe 50 into the gas-liquid separator 52, where water contained in the high-pressure hydrogen is separated and stored in the tank 62. The high-pressure hydrogen is then discharged from the gas-liquid separator 52 into the high-pressure hydrogen outlet pipe 54. When the pressure of the high-pressure hydrogen exceeds the pressure setting of the second back-pressure valve 66b, the second back-pressure valve 66b is opened to supply the high-pressure hydrogen to the hydrogen tank, not shown.

In step S2, the controller 80 judges whether the water electrolyzing process performed by the water electrolysis apparatus 12 is finished or not. If the controller 80 decides that the water electrolyzing process is finished (step S2: YES), then control goes to step S3. In step S3, the third on-off valve 78c is opened, releasing the pressure in the second flow field 46 in the water electrolysis apparatus 12 through the apparatus depressurizing line 60.

If the water electrolyzing process performed by the water electrolysis apparatus 12 is continued (step S2: NO), then the water level WS in the tank 62 rises and is detected by the water level sensor 64 combined with the tank 62. If the controller 80 decides that the water level WS is equal to or higher than the upper limit height H (step S4: YES), then control goes to step S5.

Figure 4:
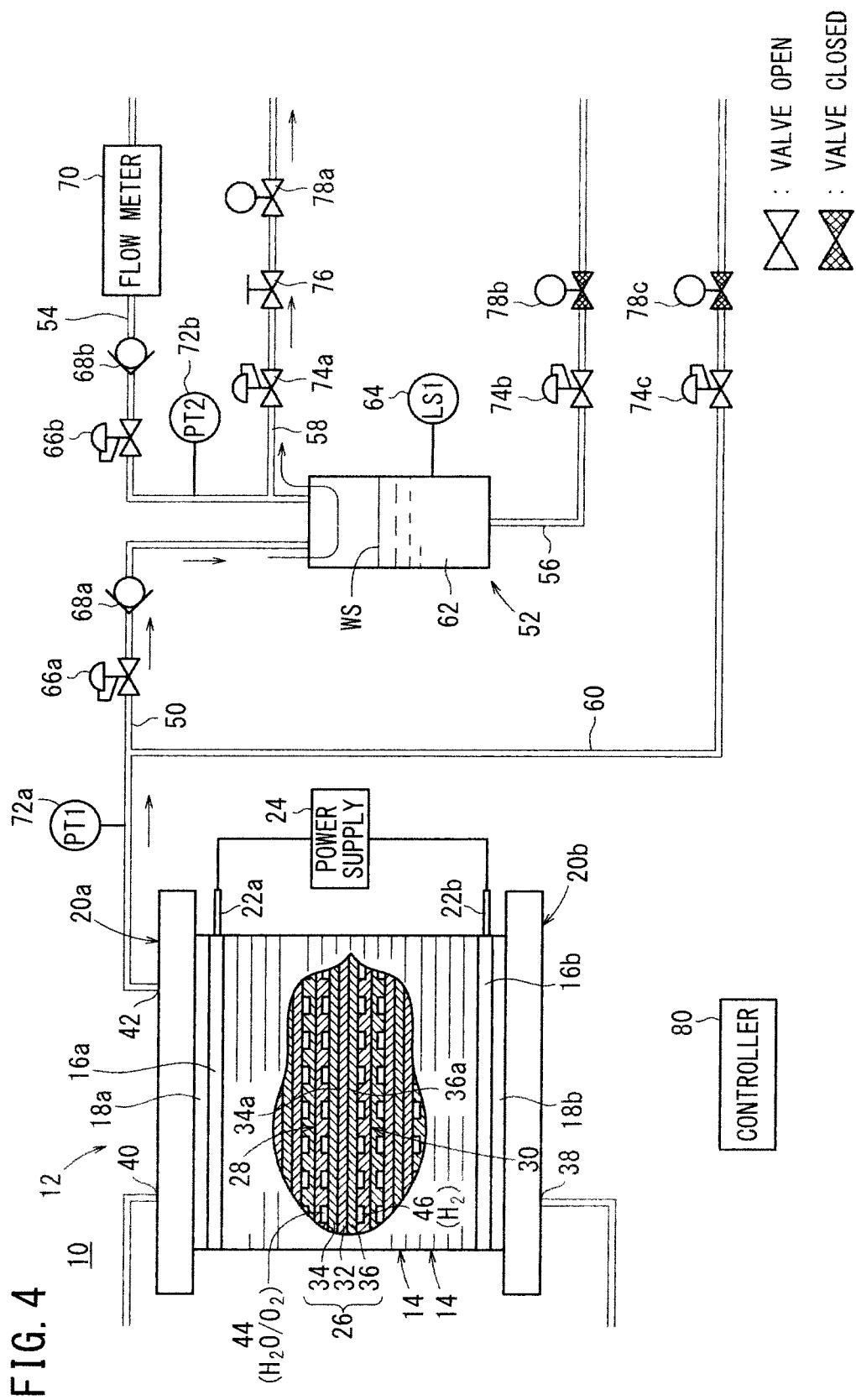
FIG. 4 is a schematic diagram of the water electrolysis system according to the first embodiment which is operating in a gas depressurizing mode.

In step S5, the controller 80 limits an electrolyzing current supplied to the water electrolysis apparatus (current limiting step), and opens the first on-off valve 78a, as shown in FIG. 4. The electrolyzing current is set to a current value for keeping the amount of water permeating from the anodes to the cathodes and the amount of water returning from the cathodes to the anodes in equilibrium with each other in the water electrolysis apparatus 12. If the solid polymer electrolyte membranes 32 are likely to become dry, then the electrolyzing current may be set to a minimum current value for allowing water to permeate from the anodes to the cathodes. When the first on-off valve 78a is opened, the high-pressure hydrogen in the tank of the gas-liquid separator 52 is discharged into the gas depressurizing line 58, lowering the pressure in the tank 62.

At this time, the second pressure gage 72b is detecting a pressure PT2 in the tank 62. The controller 80 judges whether or not the detected pressure PT2 is equal to or lower than a preset pressure α in step S6. The preset pressure α is a pressure at which no cavitation is caused in the water electrolysis apparatus 12. If the downstream side of the water electrolysis apparatus 12 has the atmospheric pressure, then the preset pressure α is set to 5 MPa or lower, for example.

Figure 5:
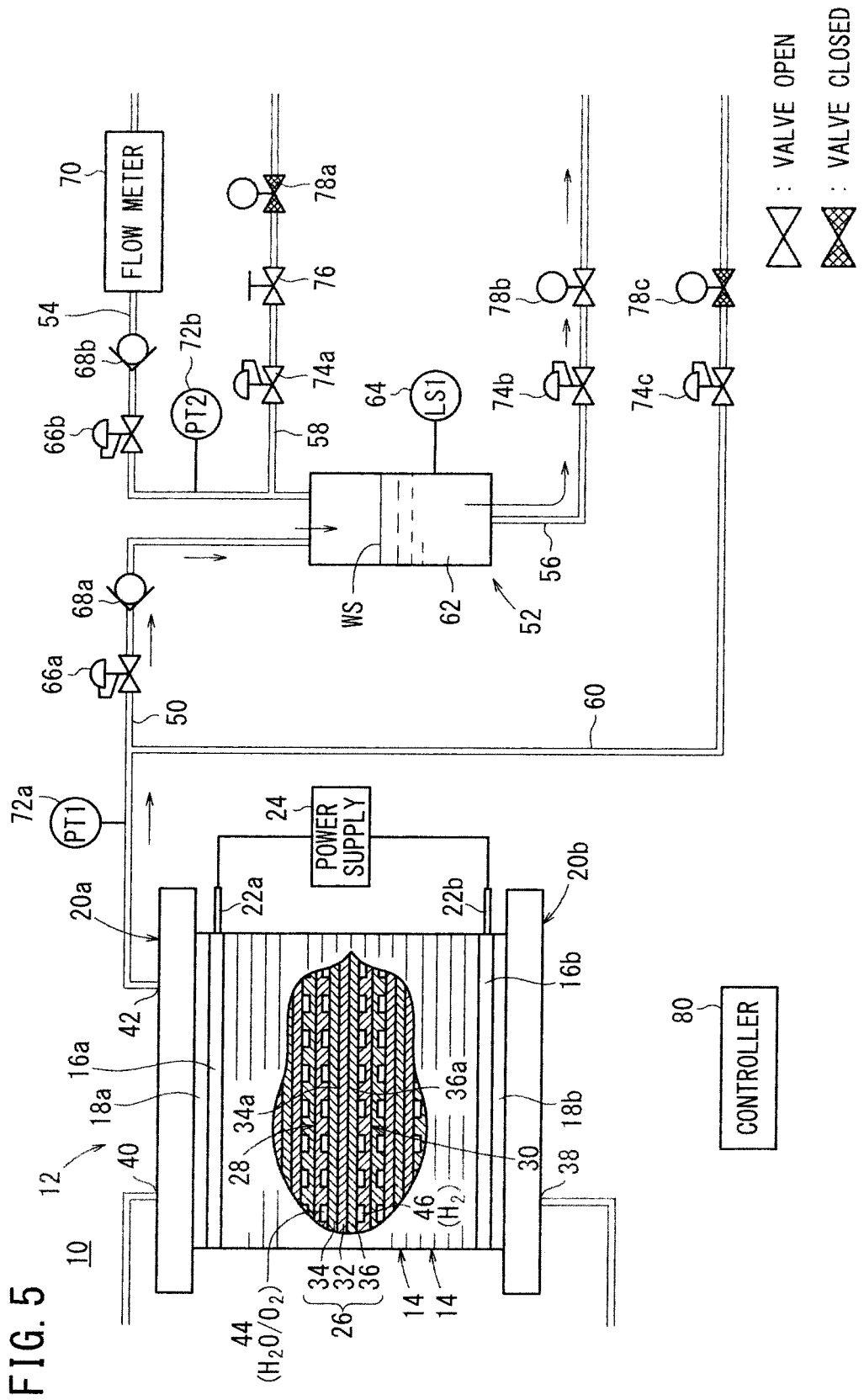
FIG. 5 is a schematic diagram of the water electrolysis system according to the first embodiment which is operating in a water discharging mode.

If the controller 80 decides that the pressure PT2 is equal to or lower than the preset pressure α (step S6: YES), then control goes to step S7. In step S7, the second on-off valve 78b is opened and the first on-off valve 78a is closed, as shown in FIG. 5. Therefore, the water in the tank 62 is discharged through the water drainage line 56. At this time, the hydrogen that is being generated by the water electrolysis apparatus 12 and introduced into the tank 62 presses remaining water in the tank 62 to flow into the water drainage line 56.

In step S8, the controller 80 judges whether or not the water level WS in the tank 62 is equal to or lower than the lower limit height L, i.e., whether the tank 62 is essentially empty or not. If the controller 80 decides that the tank 62 is essentially empty (step S8: YES), then control goes to step S9.

In step S9, the first on-off valve 78a and the second on-off valve 78b are closed, and the rated electrolyzing current is supplied to the water electrolysis apparatus 12. As shown in FIG. 2, the water electrolysis system 10 operates again in the normal mode, and the processing sequence from step S2 is carried out.

According to the first embodiment, when the water level WS in the tank 62 reaches the prescribed upper limit amount (upper limit height H), the first on-off valve 78a is opened, introducing the high-pressure hydrogen from the tank 62 into the gas depressurizing line 58 thereby to depressurize the tank 62.

The pressure in the tank 62 is now reduced nearly to the atmospheric pressure, for example. Hydrogen that is dissolved in the high-pressure water in the tank 62 is vaporized, i.e., bubbles, and discharged into the gas depressurizing line 58.

When the second on-off valve 78b is opened to discharge the water from the gas-liquid separator 52 into the water drainage line 56, therefore, the amount of hydrogen dissolved in the discharged water is effectively reduced, and high-pressure water is prevented from being discharged into the water drainage line 56.

At the same time that the amount of hydrogen dissolved in the discharged water is effectively reduced, a water vapor is prevented from being generated from the discharged water. The second pressure reducing valve 74b, for example, in the water drainage line 56 is prevented from being damaged, and hence has its durability increased.

Consequently, the devices, including the second pressure reducing valve 74b, in the water drainage line 56 have their durability increased with a relatively simple arrangement and process. The water electrolysis system 10 is thus capable of stably performing an economical and efficient water electrolyzing process.

Figure 6:
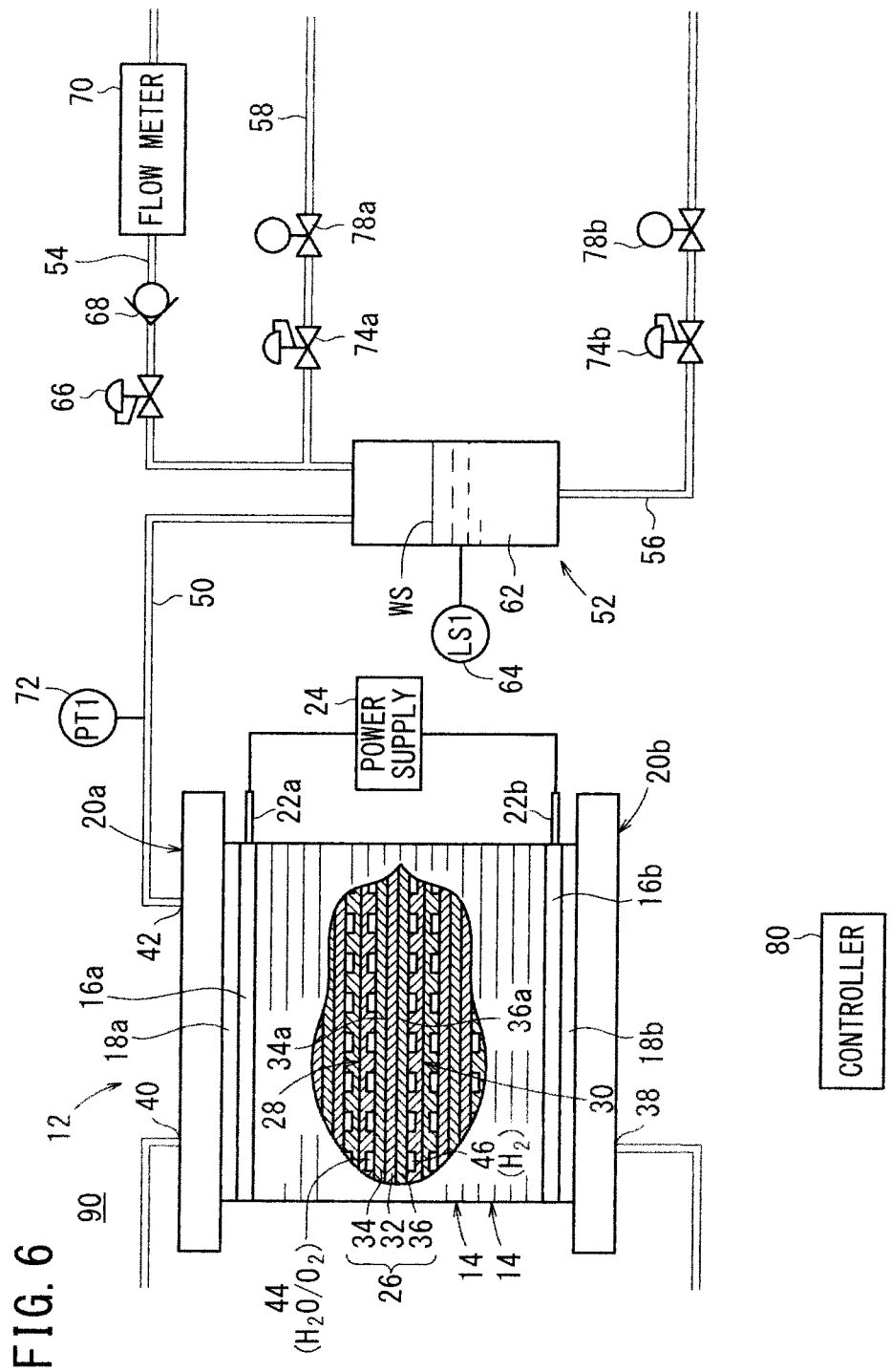
FIG. 6 is a schematic diagram of a water electrolysis system according to a second embodiment of the present invention.

FIG. 6 is a schematic diagram of a water electrolysis system 90 according to a second embodiment of the present invention.

Those parts of the water electrolysis system 90 according to the second embodiment which are identical to the water electrolysis system 10 according to the first embodiment are denoted by identical reference characters, and will not be described in detail below. The use of identical reference characters for identical parts also applies to third through eighth embodiments of the present invention to be described later.

As shown in FIG. 6, a gas-liquid separator 52 has a tank 62 to which there is connected a gas depressurizing line 58 which depressurizes the gas in the gas-liquid separator 52 and which also depressurizes the water electrolysis apparatus. The gas depressurizing line 58 includes a first pressure reducing valve 74a and a first on-off valve 78a. The water electrolysis system 90 according to the second embodiment is free of the apparatus depressurizing line 60 of the water electrolysis system 10 according to the first embodiment. A high-pressure hydrogen outlet pipe that is connected to the tank 62 includes a back-pressure valve 66 and a check valve 68. A pressure gage 72 is connected to a hydrogen pipe 50 that is connected to the tank 62.

Figure 7:
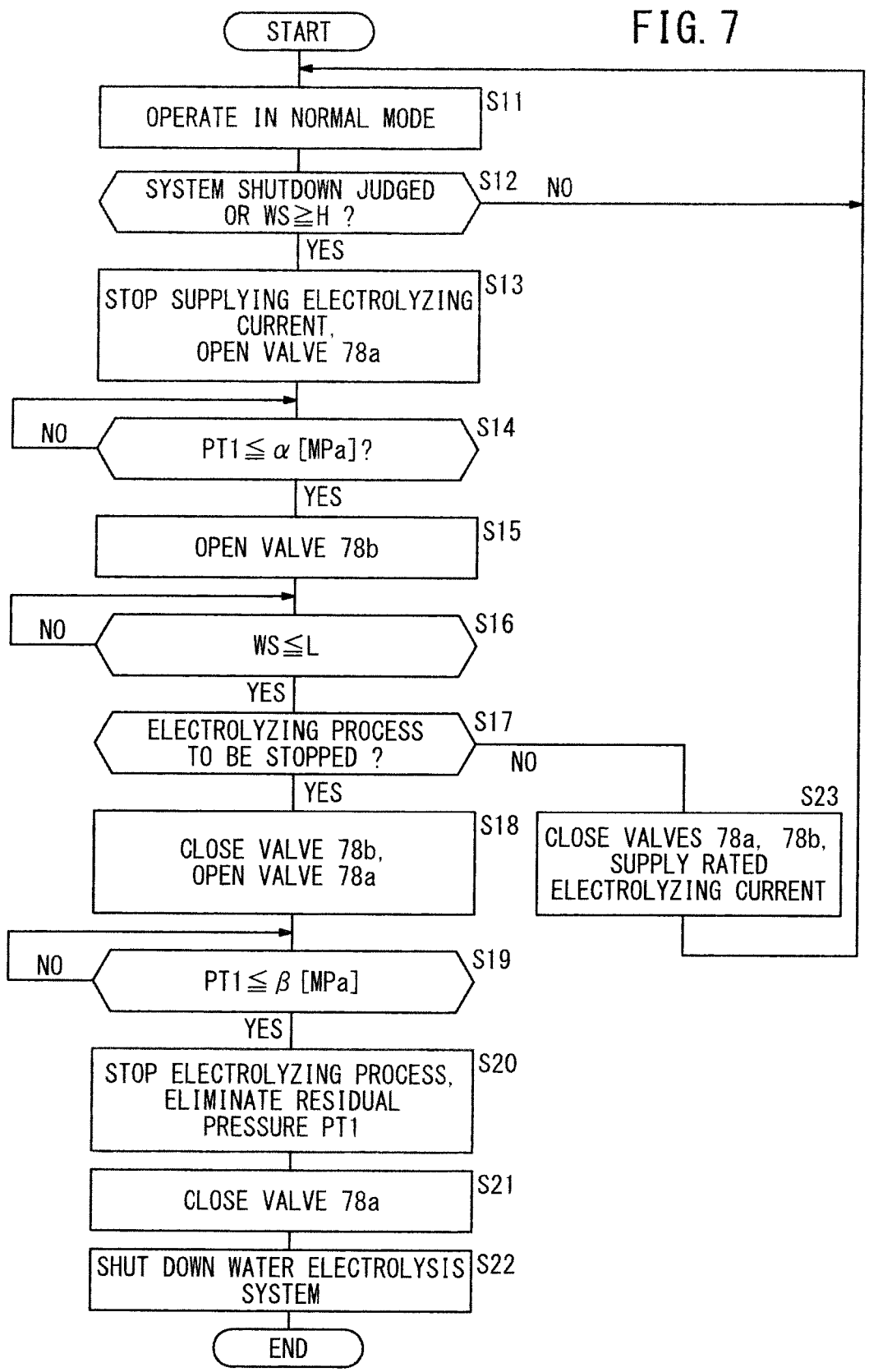
FIG. 7 is a flowchart of a method of operating the water electrolysis system according to the second embodiment.

A method of operating the water electrolysis system 90 according to the second embodiment will be described below with reference to a flowchart shown in FIG. 7.

When the first on-off valve 78a and the second on-off valve 78b are closed, the water electrolysis system 90 operates in a normal mode with the gas-liquid separator separating hydrogen and water from each other, as with the water electrolysis system 10 according to the first embodiment, in step S11.

Then, control goes to step S12. If the controller 80 decides that the water electrolysis system 90 is to be shut down or decides that the water level WS is equal to or higher than the upper limit height H (step S12: YES), then control goes from step S12 to step S13. In step S13, the controller 80 stops supplying the electrolyzing current to the water electrolysis apparatus 12 though it continues to perform a water electrolyzing process with a small current, and opens the first on-off valve 78a.

The gas in the tank 62 is depressurized. If the pressure PT1 detected by the pressure gage 72 becomes equal to or lower than the preset pressure α (step S14: YES), then control goes from step S14 to step S15. In step S15, the controller 80 opens the second on-off valve 78b, discharging water in the tank 62 under a reduced pressure into the water drainage line 56.

Then, control goes to step S16. If the water level WS in the tank 62 becomes equal to or lower than the lower limit height L (step S16: YES), then control goes from step S16 to step S17. In step S17, the controller 80 judges whether the water electrolyzing process is to be stopped or not. If the controller 80 decides that the water electrolyzing process is to be stopped (step S17: YES), then control goes to step S18 in which the controller 80 closes the second on-off valve 78b and opens the first on-off valve 78a.

When the electrolyzing process is stopped, the pressure in the water electrolysis apparatus 12 is reduced through the gas depressurizing line 58. If the residual pressure PT1 in the water electrolysis apparatus 12 becomes equal to or lower than a preset pressure β, which is a pressure level to judge that there is no residual pressure PT1 in the water electrolysis apparatus 12, (step S19: YES), then control goes to step S20. In step S20, the water electrolyzing process is completely stopped, and the residual pressure PT1 is eliminated. Thereafter, control goes to step S21 in which the controller 80 closes the first on-off valve 78a. The water electrolysis system 90 is then fully shut down in step S22.

If the controller 80 decides that the water electrolyzing process is not to be stopped, i.e., that the water electrolyzing process is to start again (step S17: NO), then control goes to step S23 in which the controller 80 closes the first on-off valve 78a and the second on-off valve 78b and supplies the rated electrolyzing current to the water electrolysis apparatus 12. Control then goes back to step S11 in which the water electrolysis system 90 operates in the normal mode.

According to the second embodiment, when the gas in the gas-liquid separator 52 is depressurized, the residual pressure PT1 in the water electrolysis apparatus 12 is simultaneously eliminated. In addition, the water electrolysis system 90 according to the second embodiment offers the same advantages as the water electrolysis system 10 according to the first embodiment.

Figure 8:
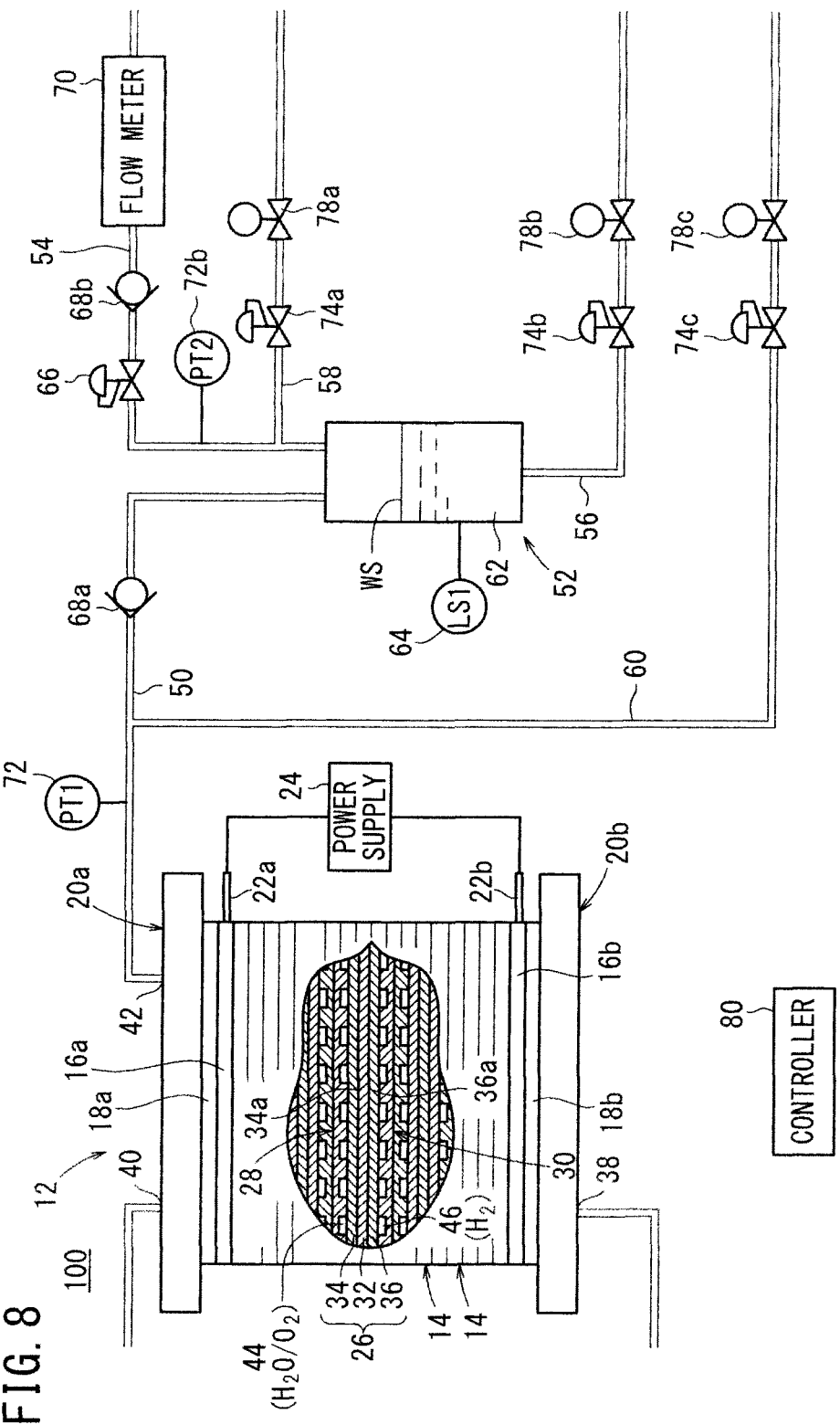
FIG. 8 is a schematic diagram of a water electrolysis system according to a third embodiment of the present invention.

FIG. 8 is a schematic diagram of a water electrolysis system 100 according to a third embodiment of the present invention.

Those parts of the water electrolysis system 100 according to the third embodiment which are identical to the water electrolysis system 10 according to the first embodiment and the water electrolysis system 90 according to the second embodiment are denoted by identical reference characters, and will not be described in detail below.

As shown in FIG. 8, a hydrogen pipe 50 is free of a back-pressure valve, but includes a first check valve 68a, and a high-pressure hydrogen outlet pipe 54 includes a back-pressure valve 66 and a second check valve 68b.

According to the third embodiment, the water electrolysis system 100 is controlled for its operation essentially in the same manner as with the water electrolysis system 90 according to the second embodiment. Specifically, when the gas in the gas-liquid separator 52 is depressurized, the residual pressure in the water electrolysis apparatus 12 is also necessarily eliminated. The residual pressure in the water electrolysis apparatus 12 can independently be eliminated through the apparatus depressurizing line 60. The third embodiment offers the same advantages as the first embodiment and the second embodiment.

Figure 9:
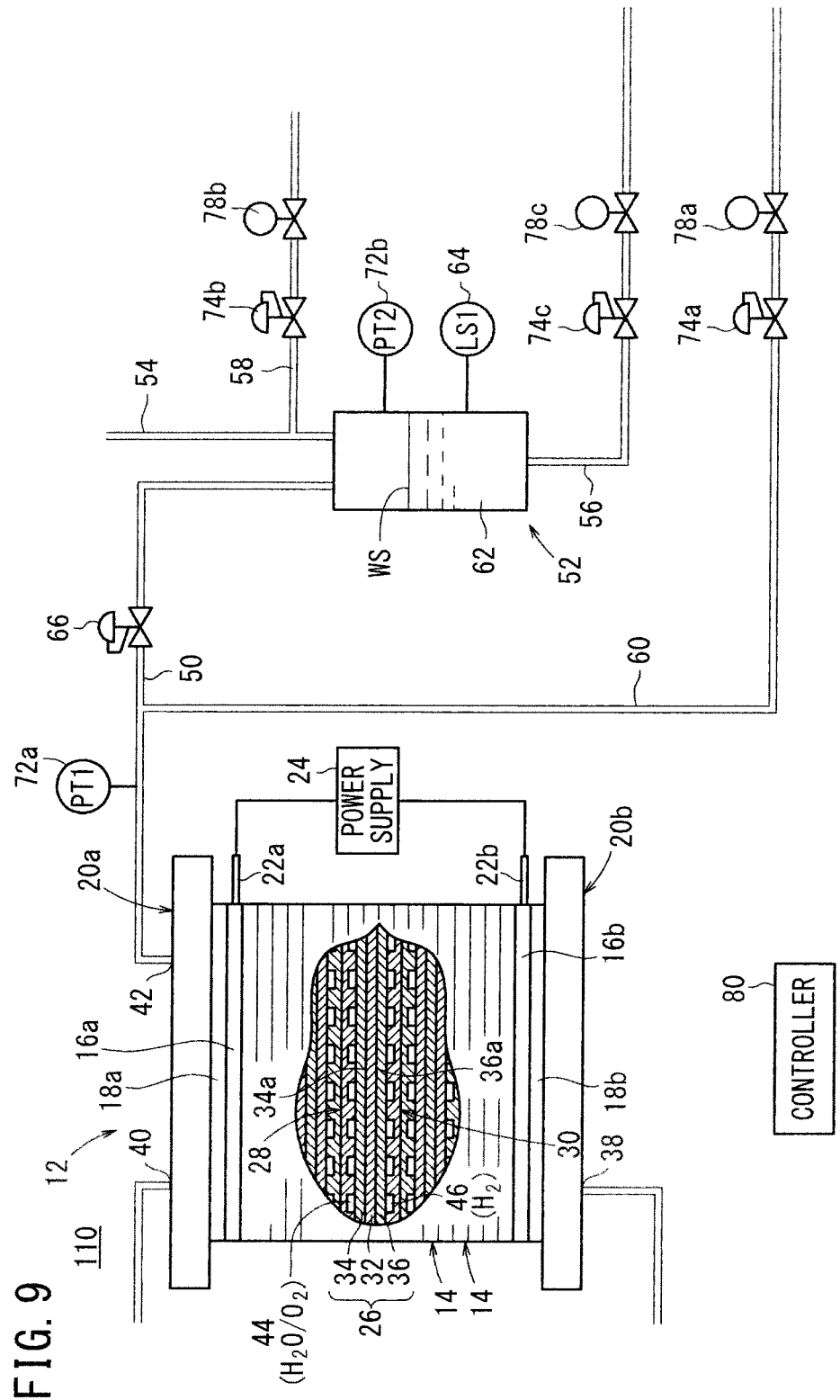
FIG. 9 is a schematic diagram of a water electrolysis system to which an operating method according to a fourth embodiment of the present invention is applied.

FIG. 9 is a schematic diagram of a water electrolysis system 110 to which an operating method according to a fourth embodiment of the present invention is applied.

In the water electrolysis system 110, a first pressure gage 72a is connected to the hydrogen pipe 50 near the end thereof that is connected to the water electrolysis apparatus 12. A second pressure gage 72b is connected to the tank 62. The first pressure gage 72a detects a pressure PT1 upstream of a back-pressure valve 66 that is included in the hydrogen pipe 50, i.e., closer to the water electrolysis apparatus 12. A second pressure gage 72b detects a pressure PT2 downstream of the back-pressure valve 66, i.e., closer to the gas-liquid separator 52.

The apparatus depressurizing line 60 includes a first pressure reducing valve 74a and a first on-off valve 78a. The gas depressurizing line 58 includes a second pressure reducing valve 74b and a second on-off valve 78b. The water drainage line 56 includes a third pressure reducing valve 74c and a third on-off valve 78c.

A method of operating the water electrolysis system 110 according to the fourth embodiment will be described below with reference to a flowchart shown in FIG. 10 and a timing chart shown in FIG. 11.

The water electrolysis system 110 is operating in a normal mode (hydrogen manufacturing step) as with the first embodiment. The high-pressure hydrogen which is manufactured flows through the hydrogen pipe 50 into the gas-liquid separator 52, where water contained in the high-pressure hydrogen is separated and stored in the tank 62. The high-pressure hydrogen is then discharged from the gas-liquid separator 52 into the high-pressure hydrogen outlet pipe 54, from which the high-pressure hydrogen can be supplied to a hydrogen tank or the like, not shown.

As the water electrolysis apparatus 12 continues its water electrolyzing process, the water level WS in the tank 62 rises and is detected by the water level sensor 64 combined with the tank 62. If the controller 80 decides that the water level WS is equal to or higher than the upper limit height H (step S31: YES), then control goes to step S32.

Figure 12:
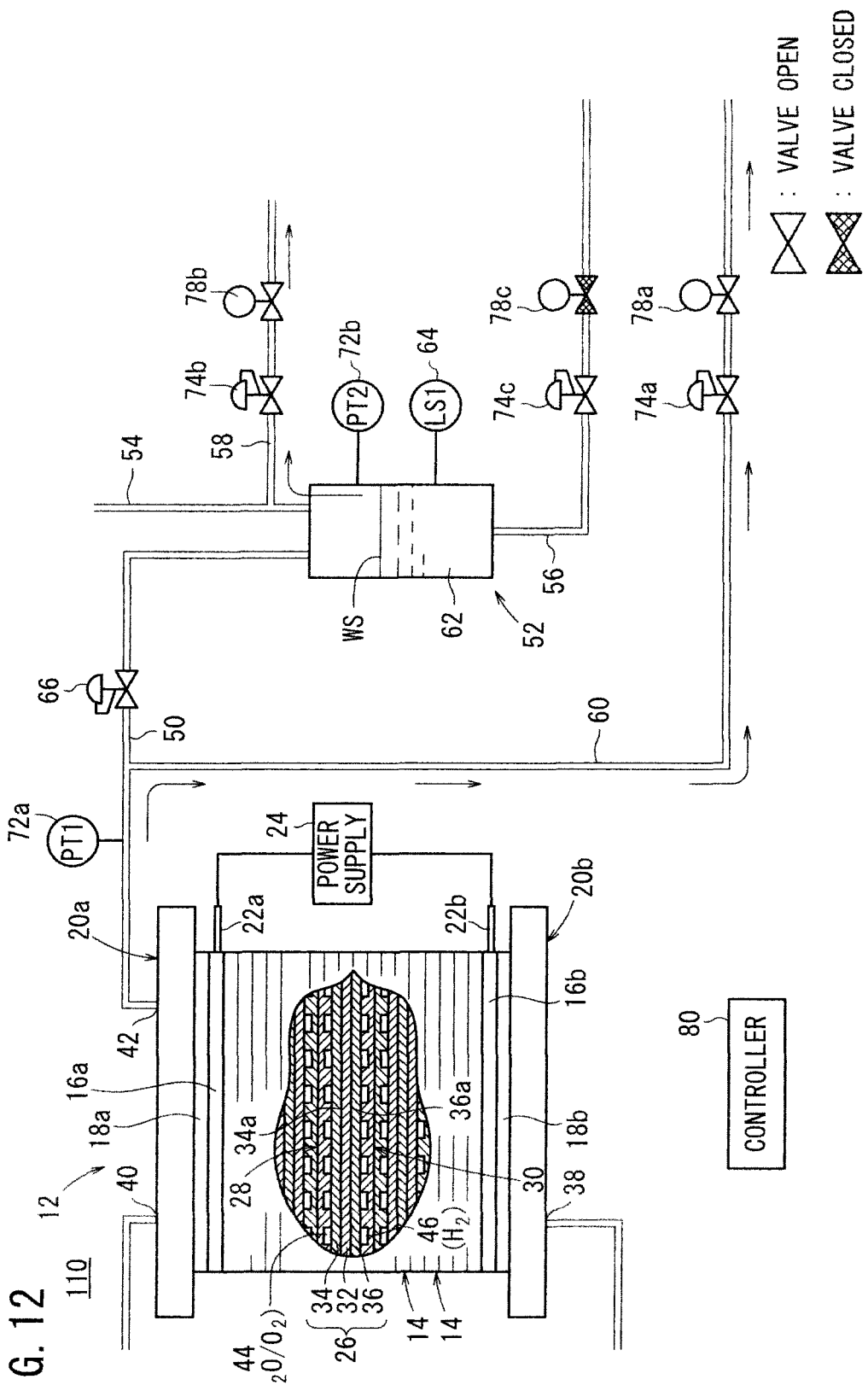
FIG. 12 is a schematic diagram of the water electrolysis system which is operating in a gas depressurizing mode according to the fourth embodiment.

In step S32, the electrolyzing current supplied to the water electrolysis apparatus 12 is limited (lowered), and the first on-off valve 78a and the second on-off valve 78b are opened, as shown in FIG. 12. The electrolyzing current is set to a current value for keeping the amount of water permeating from the anodes to the cathodes and the amount of water returning from the cathodes to the anodes in equilibrium with each other in the water electrolysis apparatus 12. If the solid polymer electrolyte membranes 32 are likely to become dry, then the electrolyzing current may be set to a minimum current value for allowing water to permeate from the anodes to the cathodes. The electrolyzing current may not be limited, if necessary.

When the first on-off valve 78a is opened, the hydrogen is discharged from the water electrolysis apparatus 12 into the apparatus depressurizing line 60. Therefore, as shown in FIG. 11, the pressure PT1 upstream of the back-pressure valve 66 is lowered by the first pressure reducing valve 74a. When the second on-off valve 78b is opened, the high-pressure hydrogen in the tank 62 is discharged into the gas depressurizing line 58. The pressure PT2 in the tank 62 is lowered by the second pressure reducing valve 74b.

The water electrolysis apparatus 12 is required to minimize the reduction of the pressure PT1 in order to perform the water electrolyzing process efficiently. On the other hand, the pressure PT2 in the tank 62 needs to drop quickly insofar as no blistering will occur on the O-rings, etc. of the devices which are subject to the pressure PT2. Therefore, the apparatus depressurizing line 60 should preferably include a needle valve, an orifice, or the like, not shown, between the first pressure reducing valve 74a and the first on-off valve 78a or downstream of the first on-off valve 78a. A needle valve, an orifice, or the like, not shown, may be provided between the second pressure reducing valve 74b and the second on-off valve 78b or downstream of the second on-off valve 78b.

The second pressure gage 72b detects the pressure PT2 in the tank 62. The controller 80 judges whether or not the detected pressure PT2 is equal to or lower than a lower limit preset pressure α in step S33. The lower limit preset pressure α is a pressure at which no cavitation is caused in the water electrolysis apparatus 12. If the downstream side of the water electrolysis apparatus 12 has the atmospheric pressure, then the lower limit preset pressure α is set to 5 MPa or lower, for example.

Figure 13:
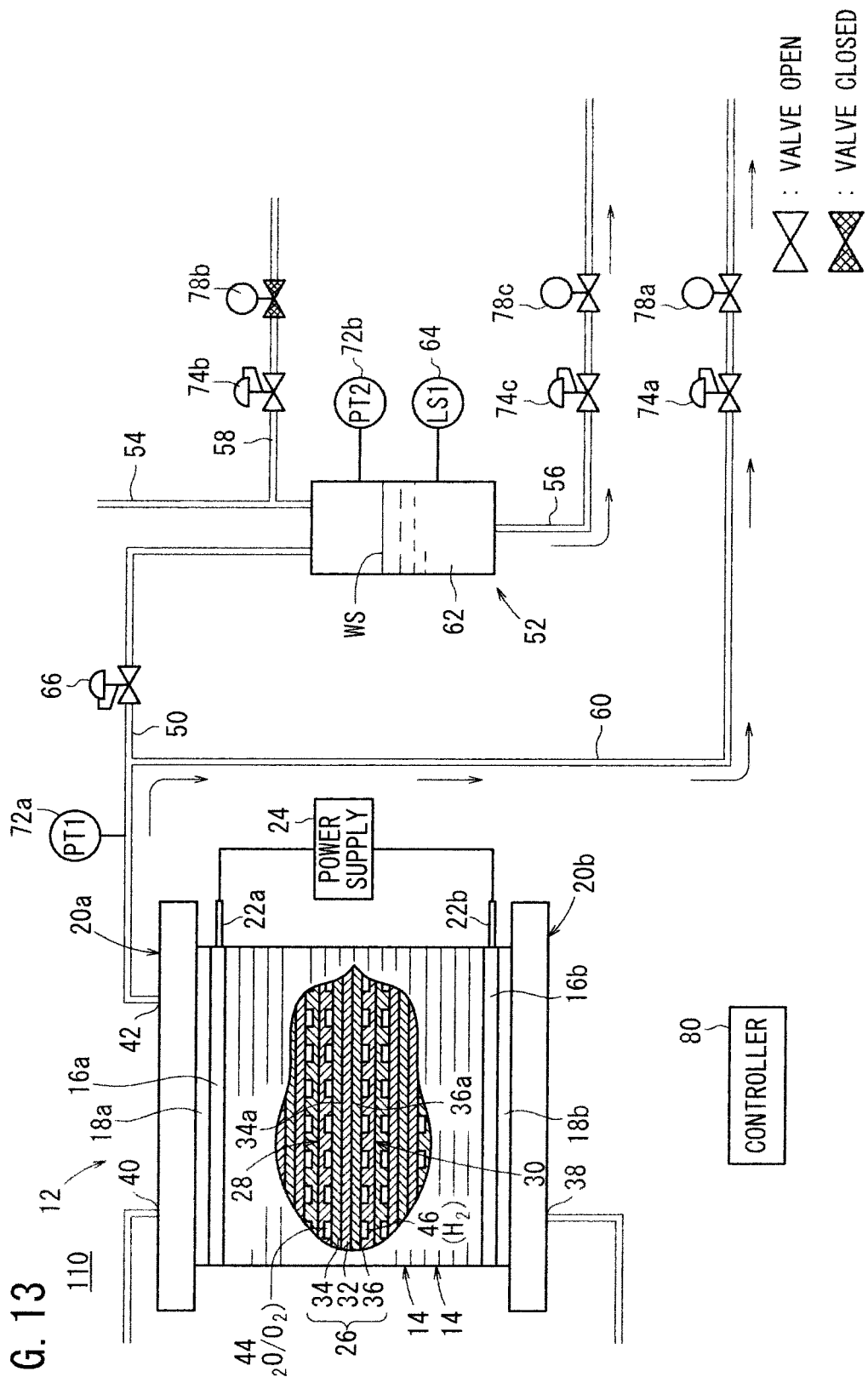
FIG. 13 is a schematic diagram of the water electrolysis system which is operating in a water discharging mode according to the fourth embodiment.

If the controller 80 decides that the pressure PT2 in the tank 62 is equal to or lower than the lower limit preset pressure α (step S33: YES), then control goes to step S34 in which the controller 80 opens the second on-off valve 78b and opens the third on-off valve 78c. Therefore, as shown in FIG. 13, the water in the tank 62 is discharged into the water drainage line 56, and the hydrogen in the water electrolysis apparatus 12 is discharged into the apparatus depressurizing line 60.

Then, control goes to step S35 in which the controller 80 judges whether or not the water level WS in the tank 62 is equal to or lower than the lower limit height L, i.e., whether the tank 62 is essentially empty or not. If the controller 80 decides that the tank 62 is essentially empty (step S35: YES), then control goes to step S36.

In step S36, the first on-off valve 78a and the third on-off valve 78c are closed. Thereafter, the rated electrolyzing current is supplied to the water electrolysis apparatus 12 in step S37.

According to the fourth embodiment, when the gas-liquid separator 52 is degassed or depressurized through the gas depressurizing line 58 after the amount of water in the tank 62 has reached the prescribed upper limit amount (upper limit height H), the water electrolysis apparatus 12 is depressurized through the apparatus depressurizing line 60 which is branched from the hydrogen pipe 50 upstream of the back-pressure valve 66. In other words, the gas-liquid separator 52 is depressurized through the gas depressurizing line 58 downstream of the back-pressure valve 66, and the water electrolysis apparatus 12 is depressurized through the apparatus depressurizing line 60 upstream of the back-pressure valve 66.

Figure 11:
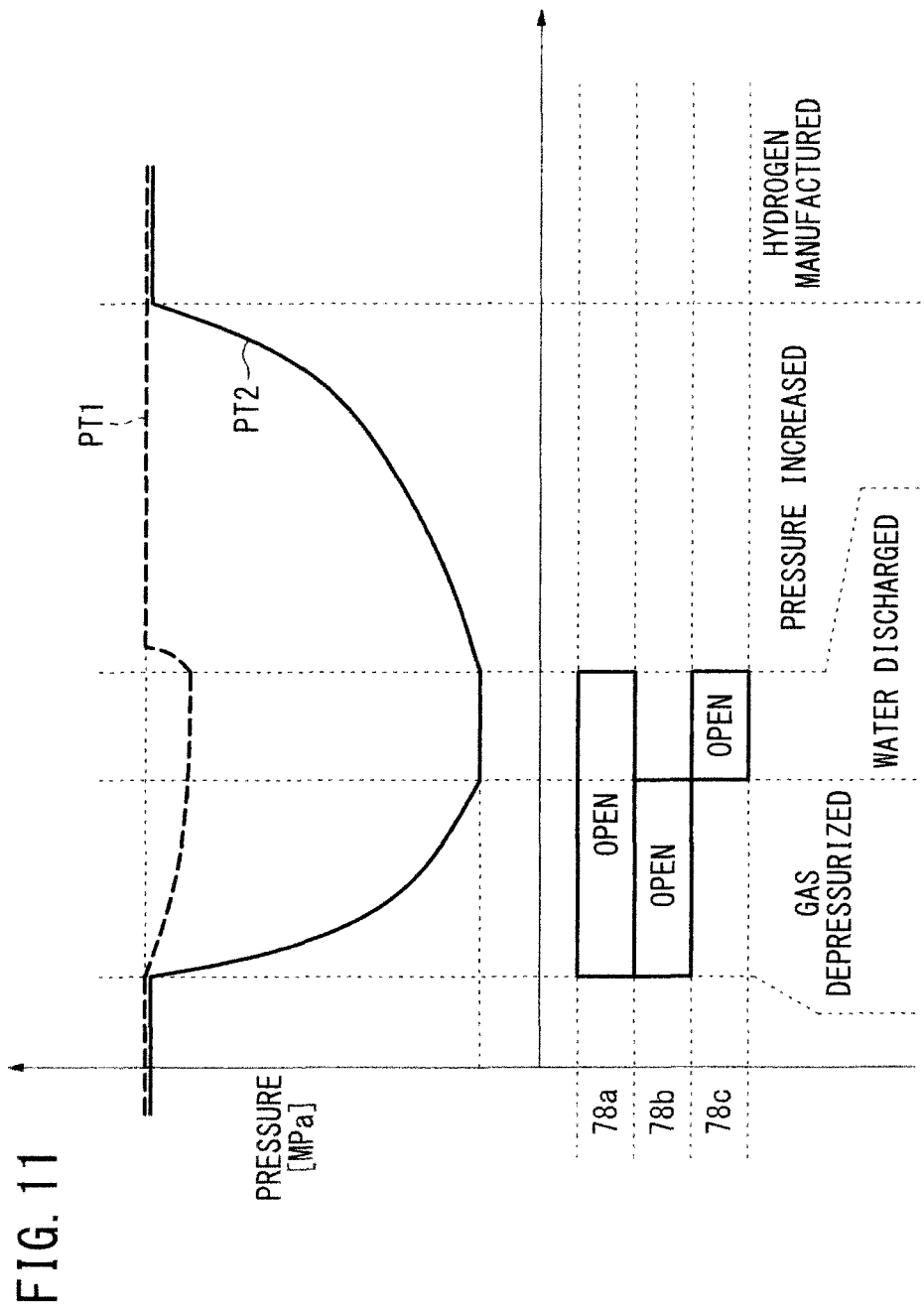
FIG. 11 is a timing chart of the operating method.

Therefore, as shown in FIG. 11, the pressure difference (PT1-PT2) between the region upstream of the back-pressure valve 66 and the region downstream of the back-pressure valve 66 is reliably prevented from increasing beyond a prescribed pressure level. The seals of the back-pressure valve 66 are thus prevented from being unduly damaged. The prescribed pressure level refers to a pressure difference which tends to cause damage to the seals of the back-pressure valve 66.

Accordingly, the gas-liquid separator 52 can be depressurized and the water can be discharged therefrom through a simple process. In addition, the durability of the back-pressure valve 66 disposed between the water electrolysis apparatus 12 and the gas-liquid separator 52 is effectively increased.

Figure 14:
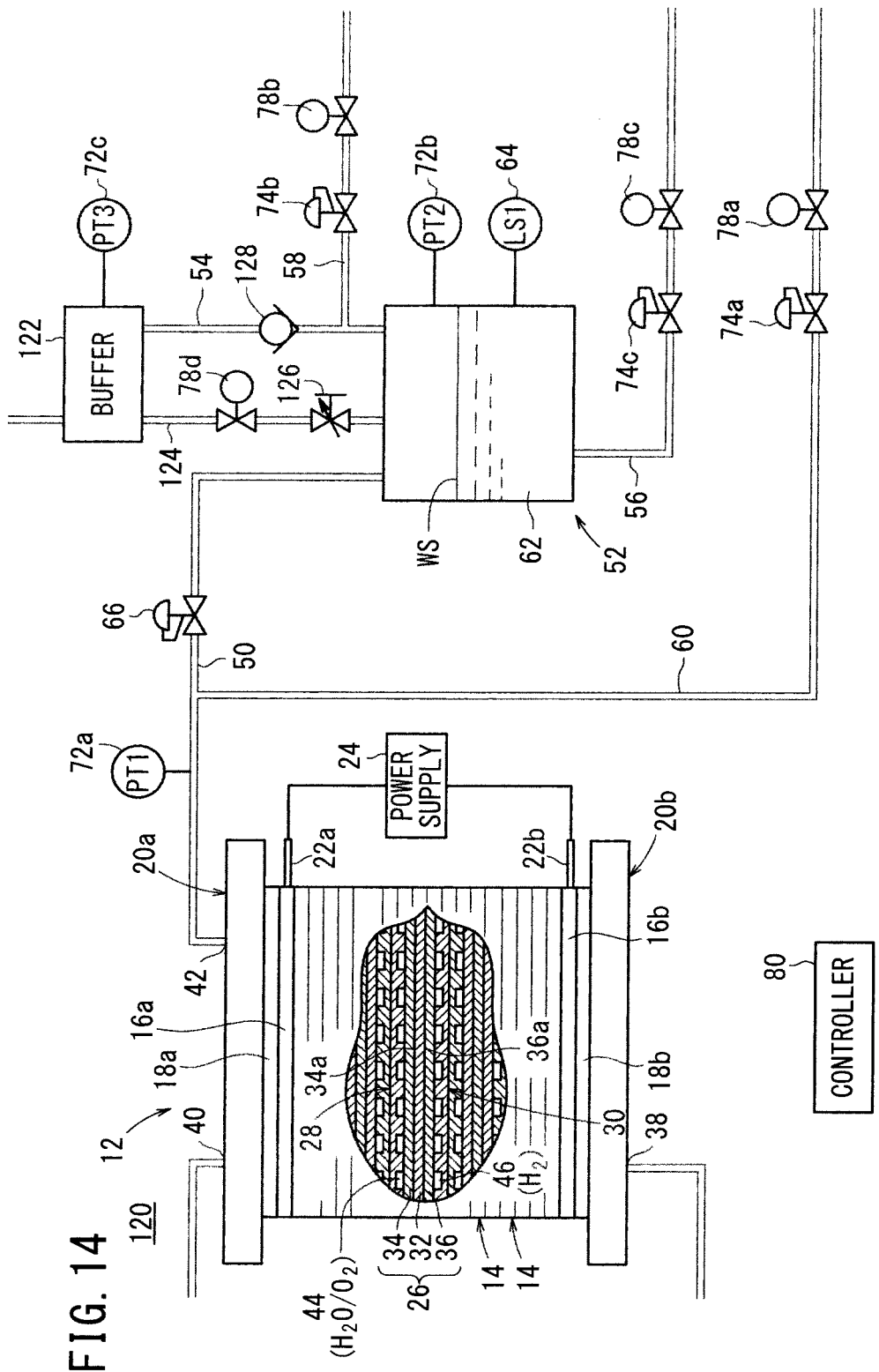
FIG. 14 is a schematic diagram of a water electrolysis system to which an operating method according to a fifth embodiment of the present invention is applied.

FIG. 14 is a schematic diagram of a water electrolysis system 120 to which an operating method according to a fifth embodiment of the present invention is applied.

As shown in FIG. 14, a buffer (high-pressure hydrogen storage device) 122 is connected to the tank 62 of the gas-liquid separator 52 by a high-pressure hydrogen outlet pipe 54. A return line (pressure equalizing line) 124 has an end connected to the buffer 122, and includes a variable restriction 126 and a fourth on-off valve 78d that are connected in series with each other. The other end of the return line 124 is connected to the tank 62.

The high-pressure hydrogen outlet pipe 54 includes a check valve 128 for preventing high-pressure hydrogen from flowing back from the buffer 122 into the tank 62. The buffer 122 is combined with a third pressure gage 72c which detects a pressure PT3 in the buffer 122.

The operating method according to the fifth embodiment which is applied to the water electrolysis system 120 will be described below with reference to a flowchart shown in FIG. 15 and a timing chart shown in FIG. 16.

Figure 10:
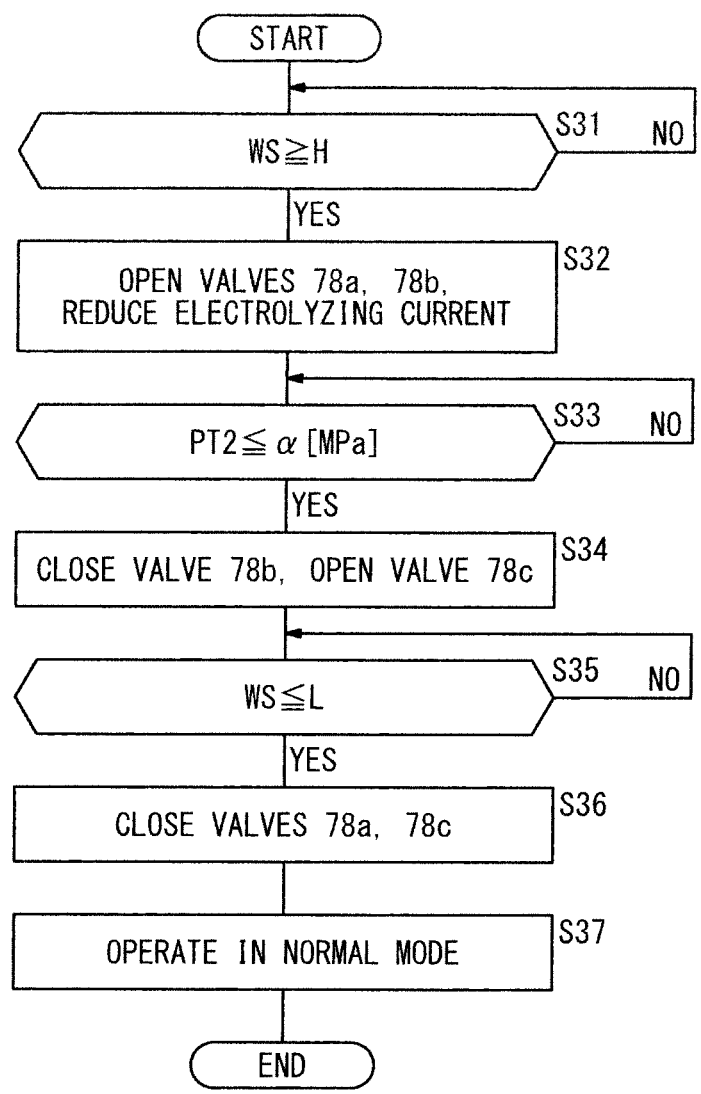
FIG. 10 is a flowchart of the operating method.

The operating method for operating the water electrolysis system 120 includes steps S41 through S45 which are identical to steps S31 through S35 shown in FIG. 10. After steps S41 through S45, if the controller 80 decides that the tank 62 is essentially empty (step S45: YES), then control goes to step S46. In step S46, the first on-off valve 78a and the third on-off valve 78c are closed, and the fourth on-off valve 78d is opened.

Figure 16:
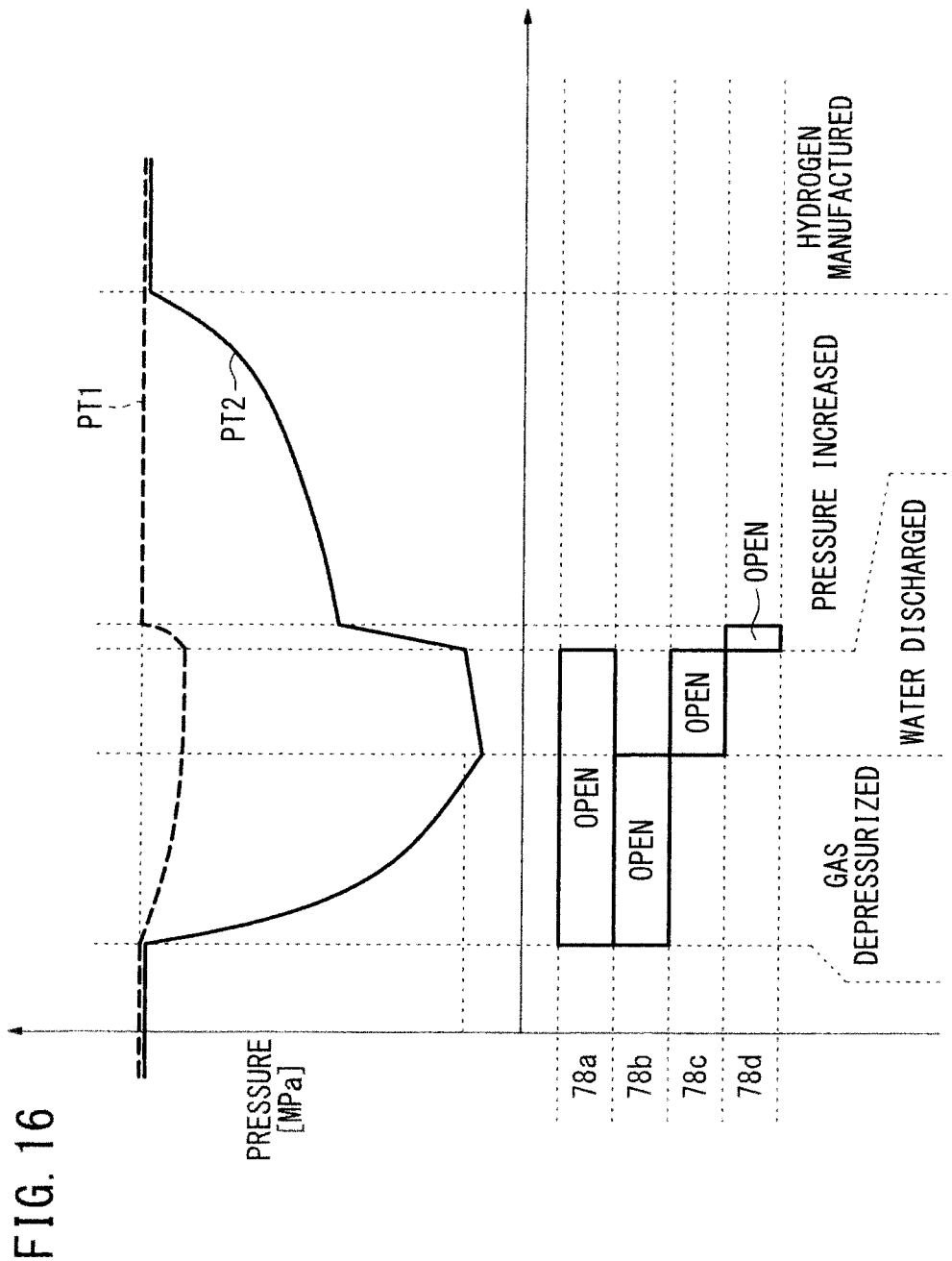
FIG. 16 is a timing chart of the operating method.

The high-pressure hydrogen that is stored in the buffer 122 is supplied through the return line 124 to the tank 62, quickly increasing the pressure in the tank 62 (see FIG. 16). If the controller 80 decides that the pressure PT2 in the tank 62 is equalized to the pressure PT3 in the buffer 122 (step S47: YES), then control goes to step S48. In step S48, the controller 80 closes the fourth on-off valve 78d and supplies the rated electrolyzing current to the water electrolysis apparatus 12. Control then goes to step S49 in which the water electrolysis system 90 operates in the normal mode.

According to the fifth embodiment, immediately after the draining of water from the tank 62 is finished, the pressure in the tank 62 can quickly be increased by the high-pressure hydrogen supplied from the buffer 122. The pressure buildup in the buffer 122 is effective to eliminate the pressure difference between the region upstream of the back-pressure valve 66 and the region downstream of the back-pressure valve 66, in a short period of time. Therefore, the durability of the back-pressure valve 66 is further reliably increased.

Figure 17:
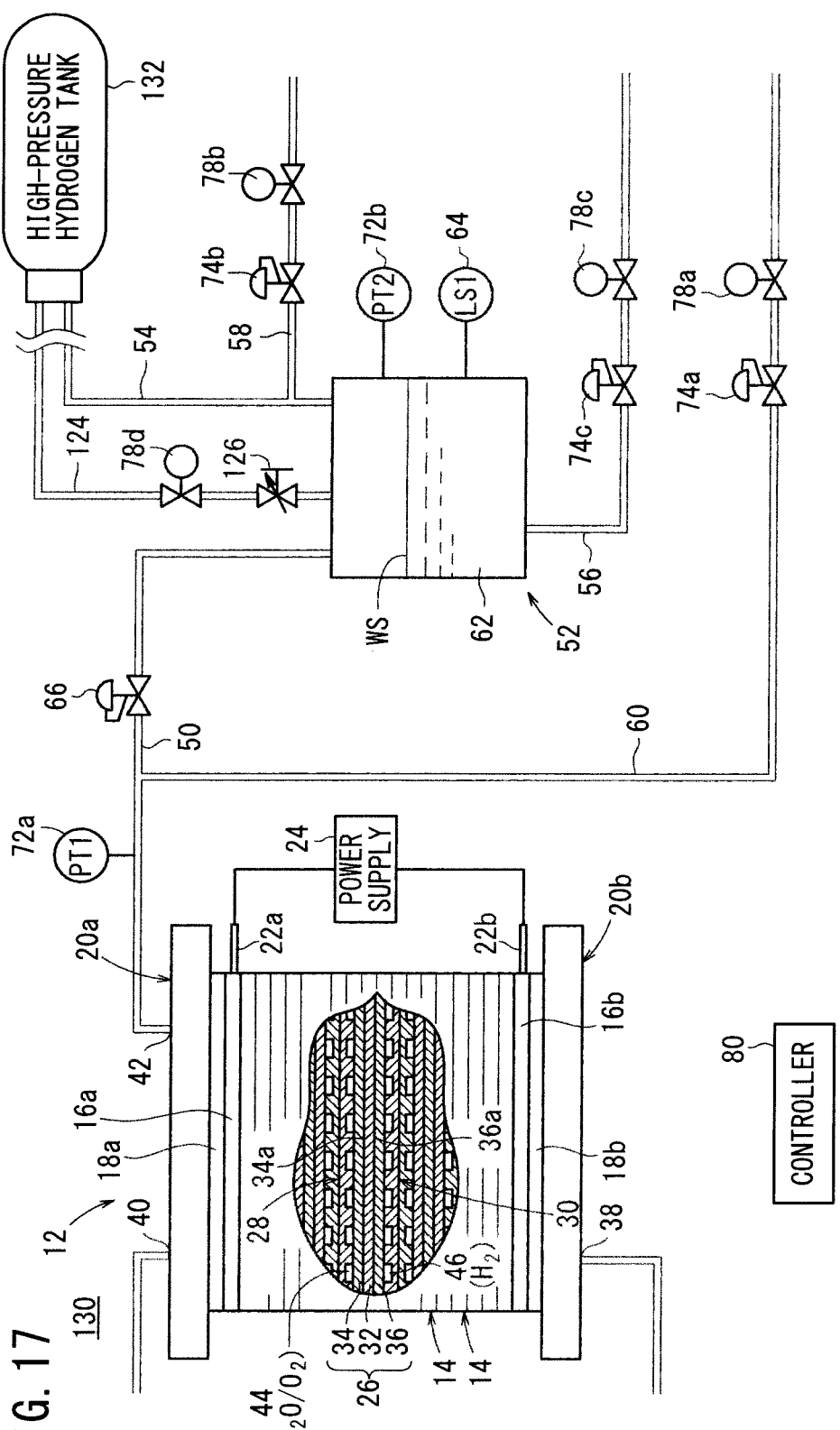
FIG. 17 is a schematic diagram of a water electrolysis system to which an operating method according to a sixth embodiment of the present invention is applied.

FIG. 17 is a schematic diagram of a water electrolysis system 130 to which an operating method according to a sixth embodiment of the present invention is applied.

As shown in FIG. 17, the water electrolysis system 130 includes a high-pressure hydrogen tank (high-pressure hydrogen storage device) 132 instead of the buffer 122 of the water electrolysis system 120 according to the fifth embodiment. The high-pressure hydrogen tank 132, which is used to fill fuel cell vehicles, not shown, with high-pressure hydrogen, is kept under a desired filling pressure of 35 MPa, for example, when it is fully loaded with high-pressure hydrogen.

Figure 15:
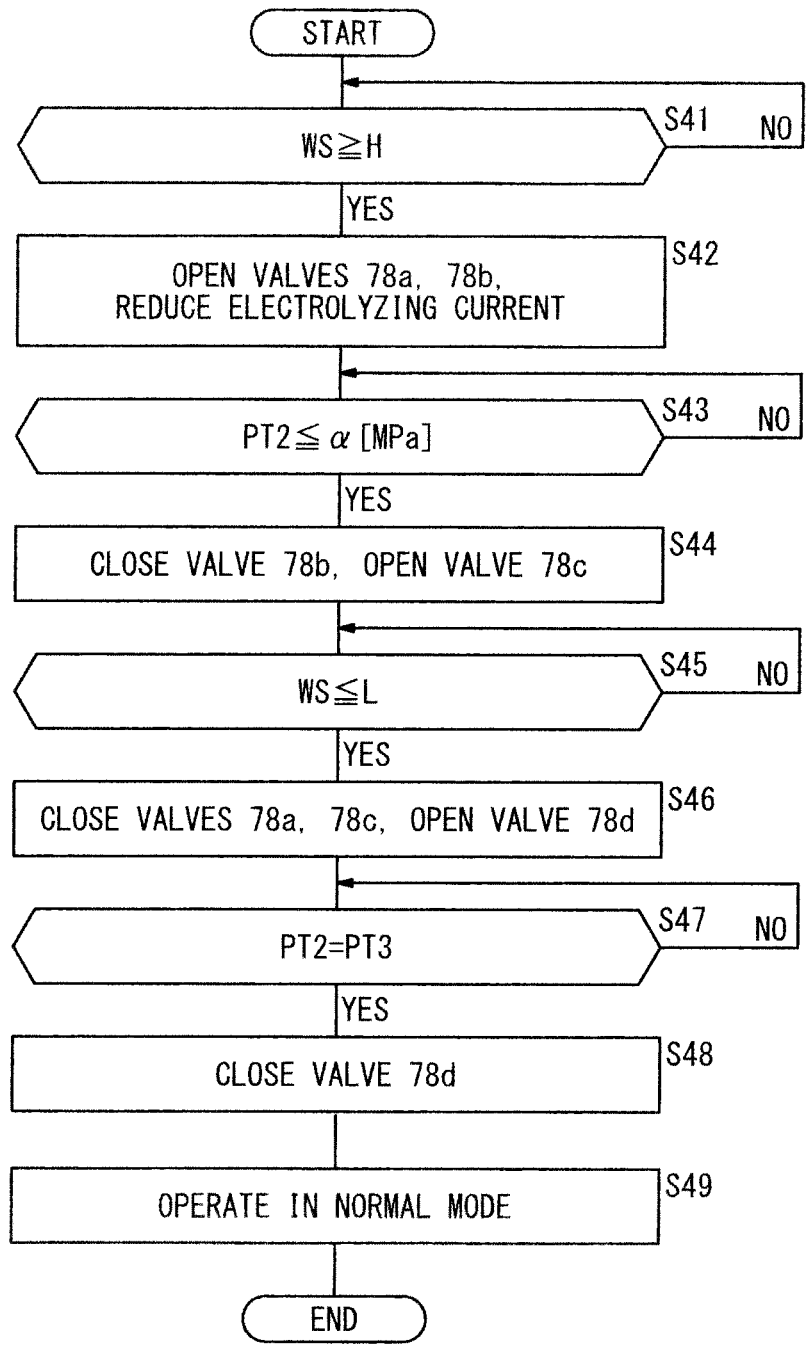
FIG. 15 is a flowchart of the operating method.
Figure 18:
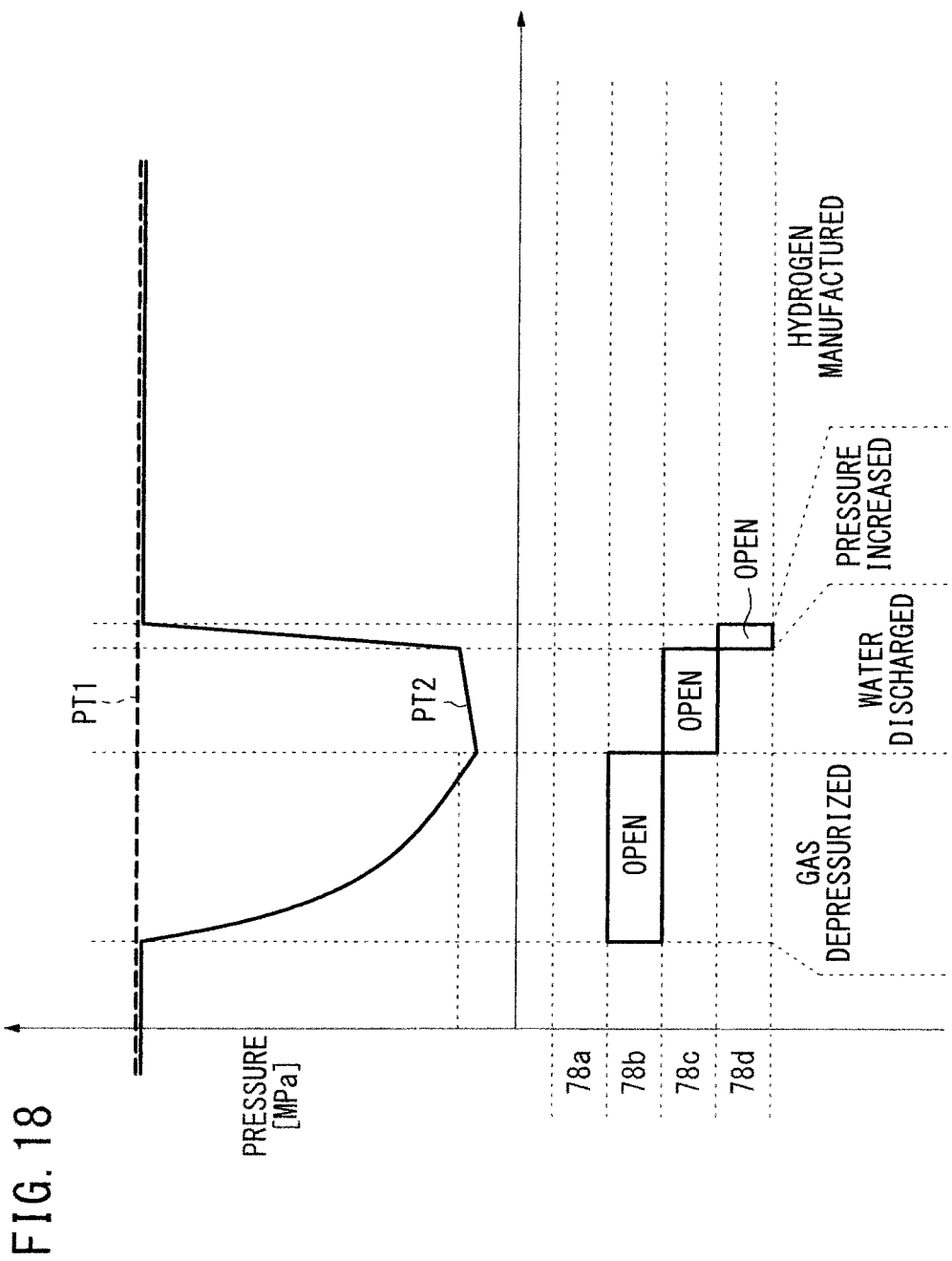
FIG. 18 is a timing chart of the operating method.

The water electrolysis system 130 is operated essentially according to the operating method according to the fifth embodiment shown in FIG. 15. However, in step S47, the controller 80 judges whether the pressure PT2 in the tank 62 is equalized to the pressure PT1 upstream of the back-pressure valve 66 (see FIG. 18). While the high-pressure hydrogen tank 132, which is of a storage capacity greater than the capacity of the gas-liquid separator 52, is being almost fully loaded with high-pressure hydrogen, it can instantaneously equalize the pressure PT2 to the pressure PT1 when it supplies the high-pressure hydrogen to the tank 62 to increase the pressure PT2.

According to the sixth embodiment, when the gas in the tank 62 is depressurized and the water is discharged therefrom, the water electrolysis apparatus 12 may not be depressurized through the apparatus depressurizing line 60 upstream of the back-pressure valve 66 (see FIG. 18) because the high-pressure hydrogen tank 132 can quickly increase the pressure PT2 in the tank 62, shortening the period of time in which the pressure difference referred to above develops.

Figure 19:
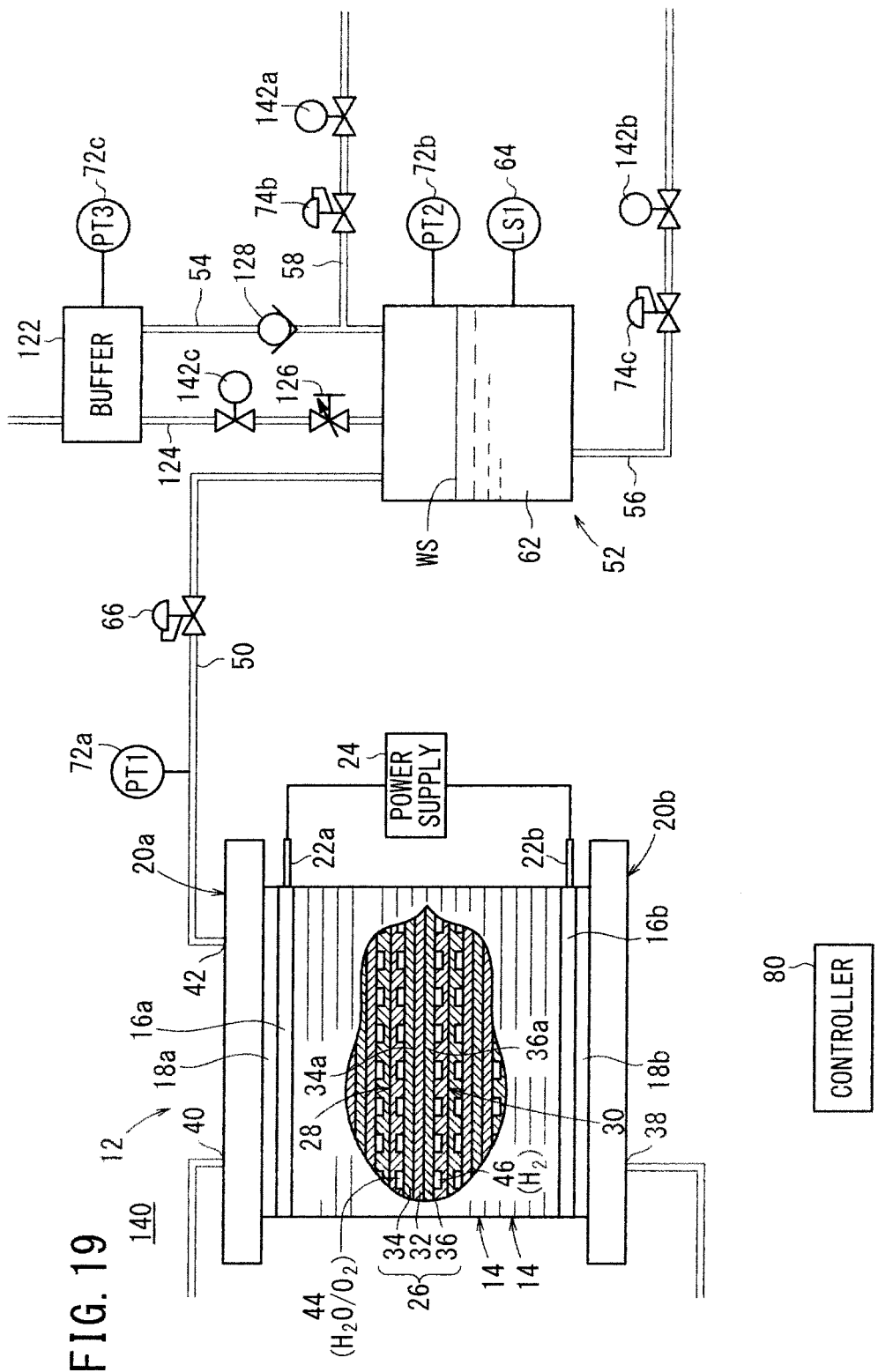
FIG. 19 is a schematic diagram of a water electrolysis system to which an operating method according to a seventh embodiment of the present invention is applied.

FIG. 19 is a schematic diagram of a water electrolysis system 140 to which an operating method according to a seventh embodiment of the present invention is applied.

As shown in FIG. 19, the water electrolysis system 140 is free of the apparatus depressurizing line 60. The gas depressurizing line 58 includes a first on-off valve 142a. The water drainage line 56 includes a second on-off valve 142b. The return line 124 includes a third on-off valve 142c. The buffer 122 is used as a high-pressure hydrogen storage device. However, the high-pressure hydrogen tank 132, for example, may alternatively be used as a high-pressure hydrogen storage device in the present embodiment and also in an eighth embodiment to be described below.

The operating method according to the seventh embodiment which is applied to the water electrolysis system 140 will be described below with reference to a flowchart shown in FIG. 20 and a timing chart shown in FIG. 21.

If the controller 80 decides that the water level WS in the tank 62 is equal to or higher than the upper limit height H (step S51: YES), then control goes to step S52 in which the controller 80 opens the first on-off valve 142a and limits an electrolyzing current supplied to the water electrolysis apparatus 12. The high-pressure hydrogen in the tank 62 is discharged into the gas depressurizing line 58, lowering the pressure PT2 in the tank 62.

If the controller 80 decides that the pressure PT2 in the tank 62 is equal to or lower than the lower limit preset pressure α (step S53: YES), then the controller closes the first on-off valve 142a and opens the second on-off valve 142b in step S54. The water in the tank 62 is thus discharged through the water drainage line 56. If the controller 80 decides that the tank 62 is essentially empty (step S55: YES), then control goes to step S56 in which the controller 80 closes the second on-off valve 142b and opens the third on-off valve 142c.

The buffer 122 now supplies the high-pressure hydrogen to the tank 62. If the controller 80 decides that the pressure PT2 in the tank 62 is equalized to the pressure PT3 in the buffer 122 (step S57: YES), then control goes to step S58 in which the controller 80 closes the third on-off valve 142c and supplies the rated electrolyzing current to the water electrolysis apparatus 12, operating the water electrolysis system 90 in the normal mode in step S59.

Therefore, the seventh embodiment offers the same advantages as the fourth through sixth embodiments described above.

Figure 22:
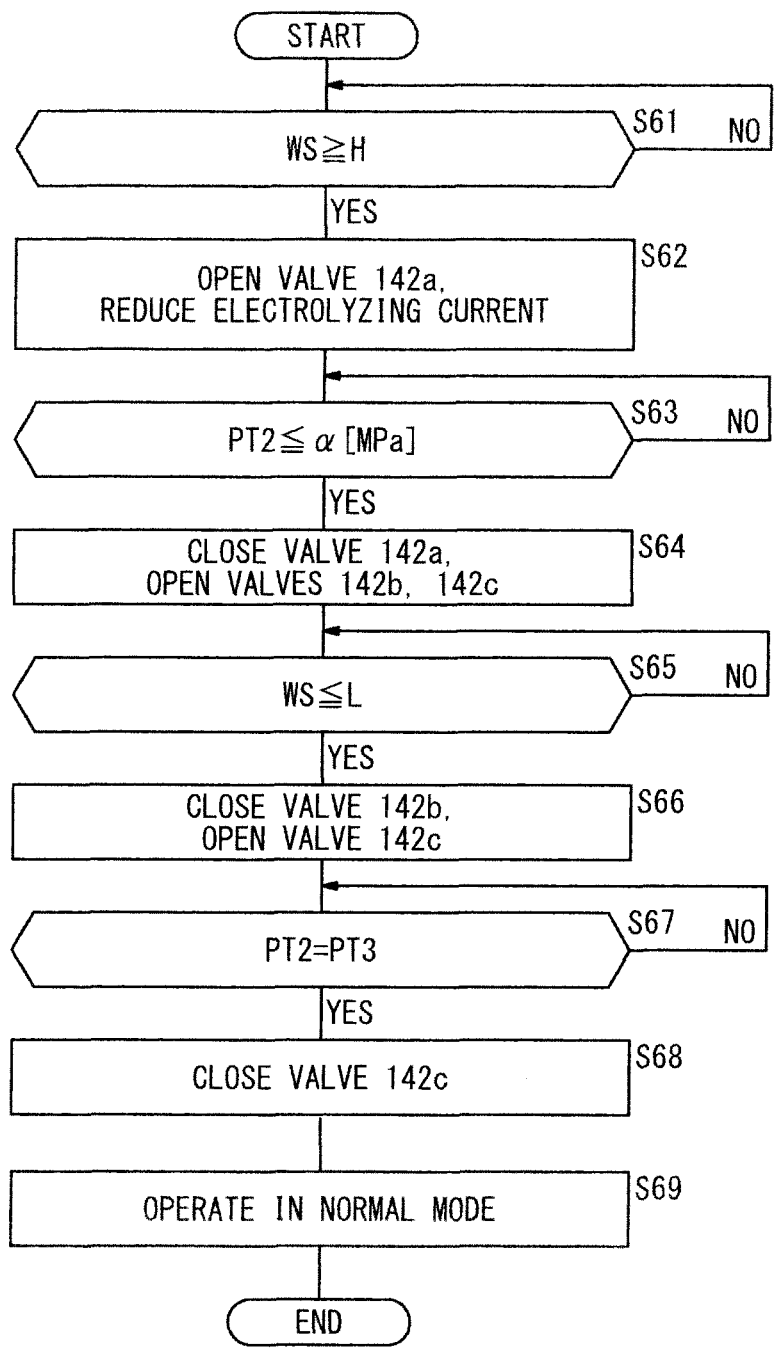
FIG. 22 is a flowchart of an operating method according to an eighth embodiment of the present invention.
Figure 23:
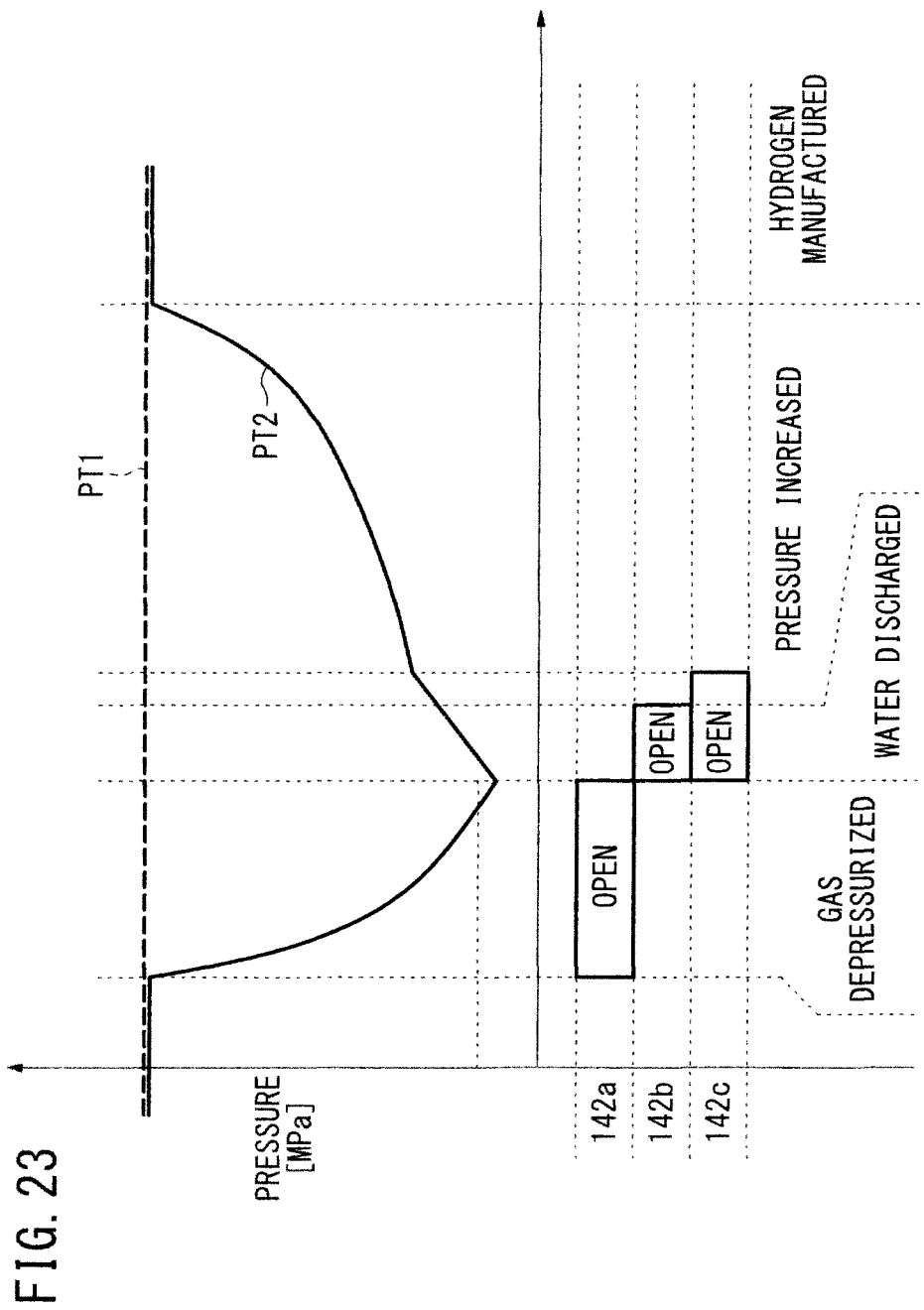
FIG. 23 is a timing chart of the operating method.
Figure 24:
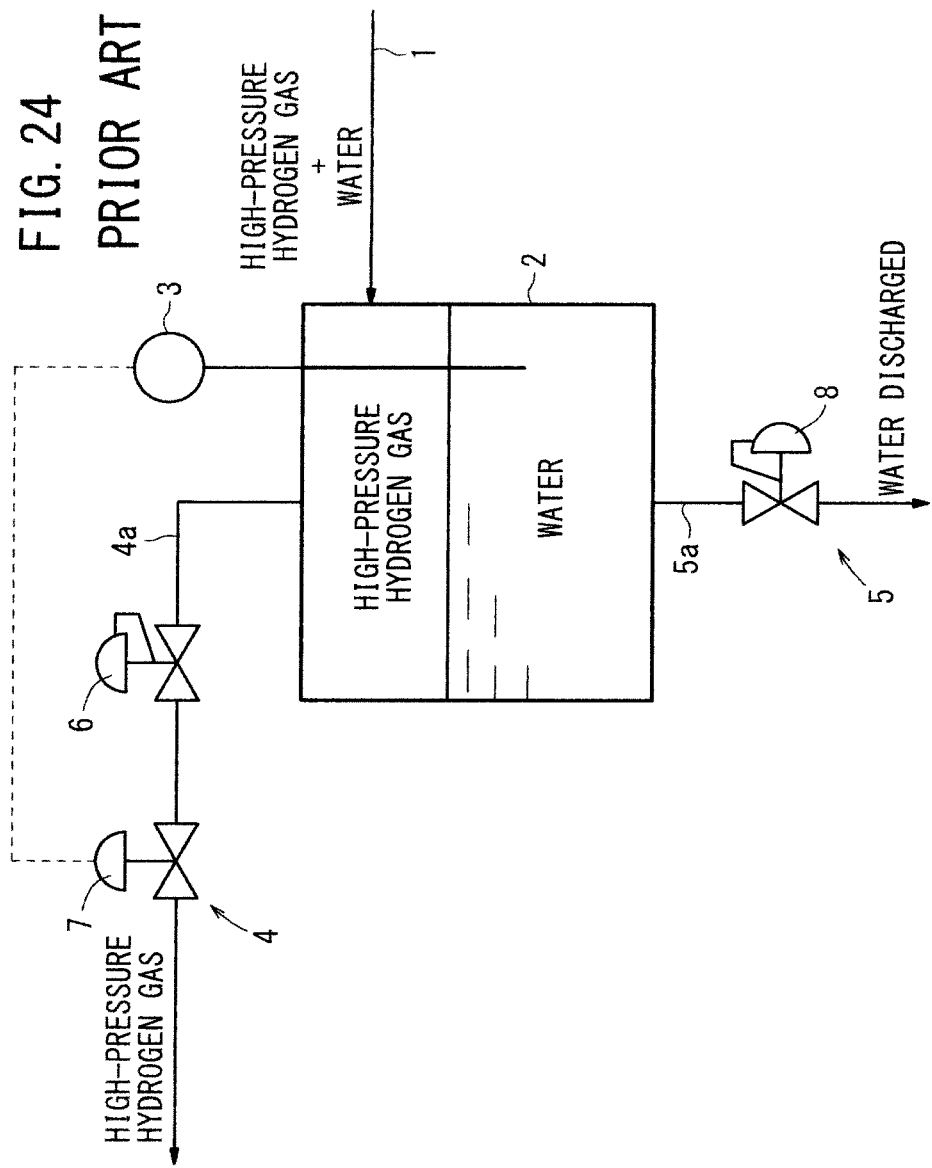
FIG. 24 is a schematic diagram of a gas-liquid separator disclosed in Japanese Laid-Open Patent Publication No. 2006-347779.

An operating method according to an eighth embodiment of the present invention will be described below with reference to a flowchart shown in FIG. 22 and a timing chart shown in FIG. 23. According to the eighth embodiment, the operating method operates the water electrolysis system 140 shown in FIG. 19 to which the operating method according to the seventh embodiment is applied.

Figure 20:
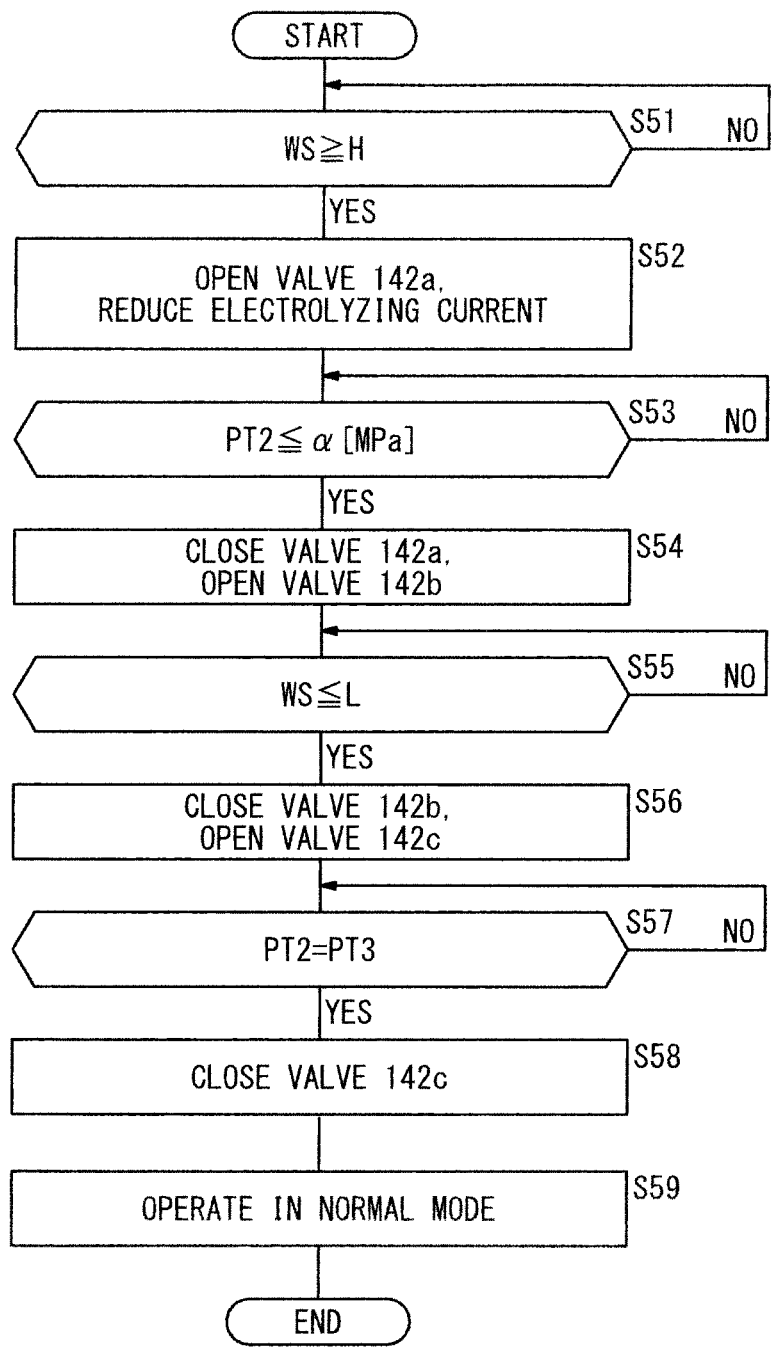
FIG. 20 is a flowchart of the operating method.
Figure 21:
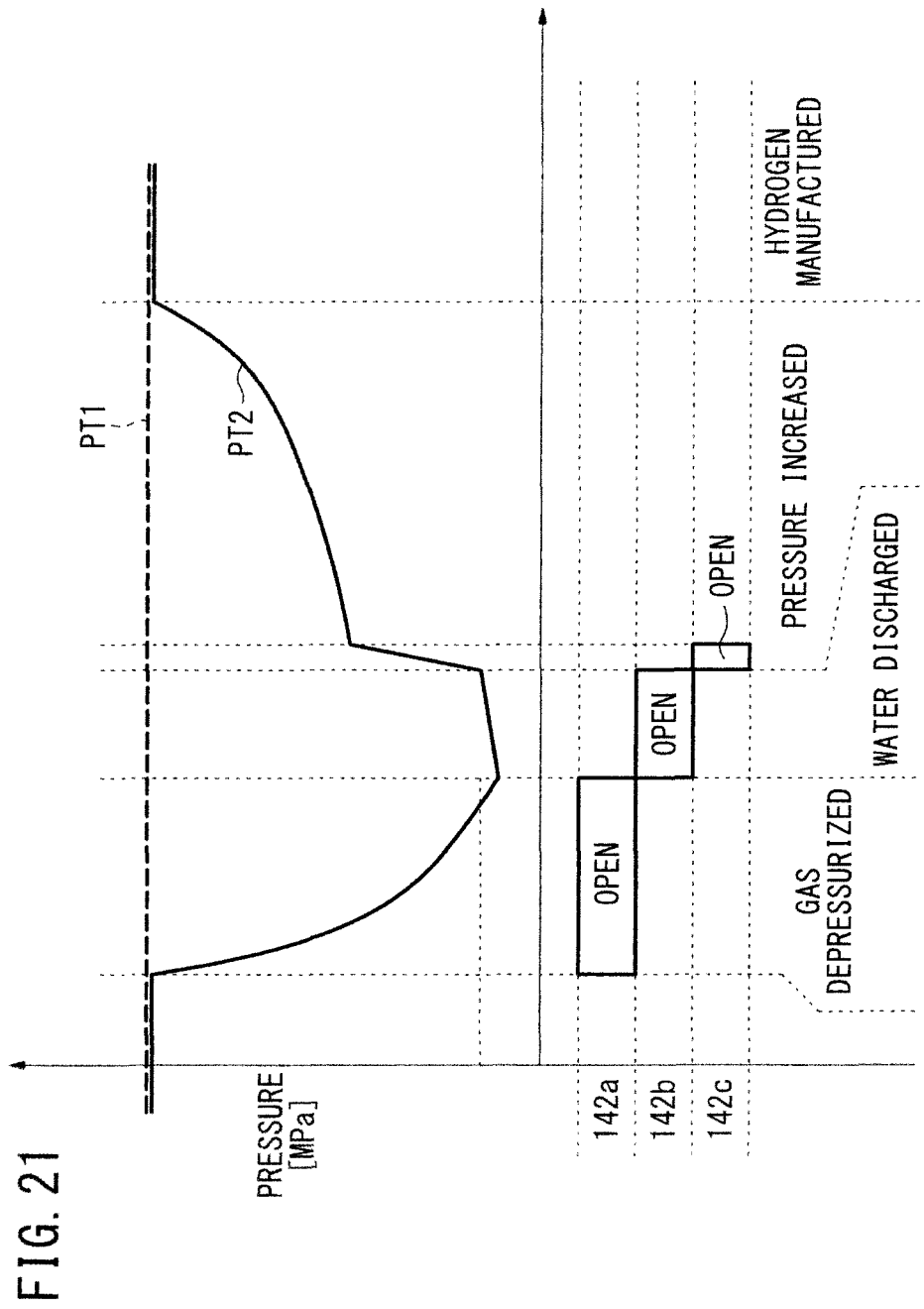
FIG. 21 is a timing chart of the operating method.

The operating method according to the eighth embodiment includes steps S61 through S63 which are identical to steps S51 through S53 shown in FIG. 20. After steps S61 through S63, the controller 80 closes the first on-off valve 142a, and opens the second on-off valve 142b and the third on-off valve 142c. Therefore, the water in the tank is thus discharged through the water drainage line 56, and the high-pressure hydrogen is supplied from the buffer 122 to the tank 62.

According to the eighth embodiment, therefore, at the same time that the water is discharged from the tank 62, the pressure in the tank 62 is increased by the high-pressure hydrogen supplied from the buffer 122. The water in the tank 62 is quickly discharged therefrom under the pressure of the high-pressure hydrogen. In addition, the eighth embodiment offers the same advantages as the seventh embodiment.

Although certain preferred embodiments of the present invention have been shown and described in detail, it should be understood that various changes and modifications may be made therein without departing from the scope of the appended claims.

What is claimed is:

1. A water electrolysis system comprising:
    a water electrolysis apparatus configured to electrically decompose water to generate oxygen and high-pressure hydrogen having a pressure higher than the oxygen;
    a gas-liquid separator connected to a hydrogen pipe which discharges the high-pressure hydrogen from the water electrolysis apparatus, configured to separate water contained in the high-pressure hydrogen;
    a high-pressure hydrogen outlet pipe configured to deliver the high-pressure hydrogen separated from water from the gas-liquid separator;
    a water drainage line configured to discharge the water from the gas-liquid separator;
    a gas depressurizing line connected to the gas-liquid separator; and
    a controller configured to degas the gas-liquid separator before the water is discharged from the gas-liquid separator into the water drainage line.

2. The water electrolysis system according to claim 1, wherein the gas depressurizing line includes a first pressure reducing valve and a first on-off valve, and the water drainage line includes a second pressure reducing valve and a second on-off valve.

3. The water electrolysis system according to claim 1, further comprising:
    a water electrolysis apparatus depressurizing line branched from the hydrogen pipe upstream of the gas-liquid separator.

4. A method of operating a water electrolysis system including a water electrolysis apparatus for electrically decomposing water to generate oxygen and high-pressure hydrogen having a pressure higher than the oxygen, a gas-liquid separator connected to a hydrogen pipe which discharges the high-pressure hydrogen from the water electrolysis apparatus, for separating water contained in the high-pressure hydrogen, a high-pressure hydrogen outlet pipe for delivering the high-pressure hydrogen separated from water from the gas-liquid separator, a water drainage line for discharging the water from the gas-liquid separator, and a gas depressurizing line connected to the gas-liquid separator, for degassing the gas-liquid separator before the water is discharged from the gas-liquid separator into the water drainage line, the method comprising the steps of:
    discharging the high-pressure hydrogen from the gas-liquid separator into the gas depressurizing line if the amount of water in the gas-liquid separator is judged as being equal to or greater than a prescribed amount; and
    discharging the water from the gas-liquid separator into the water drainage line if the pressure in the gas-liquid separator is judged as being equal to or lower than a prescribed pressure.

5. The method according to claim 4, further comprising the step of:
    limiting a current supplied to the water electrolysis apparatus if the amount of water in the gas-liquid separator is judged as being equal to or greater than the prescribed amount.

* * * * *